(12) United States Patent
Maha et al.

(10) Patent No.: US 12,294,611 B2
(45) Date of Patent: May 6, 2025

(54) PHISHING MITIGATION SERVICE

(71) Applicant: McAfee, LLC, San Jose, CA (US)

(72) Inventors: Davoud Maha, Danville, CA (US); Mykhaylo Melnyk, Waterloo (CA); Lior Rudnik, Dublin, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 17/960,706

(22) Filed: Oct. 5, 2022

(65) Prior Publication Data

US 2023/0021885 A1 Jan. 26, 2023

Related U.S. Application Data

(63) Continuation of application No. 16/704,918, filed on Dec. 5, 2019, now abandoned.

(51) Int. Cl.
| G06F 15/16 | (2006.01) |
| H04L 9/40 | (2022.01) |
| H04L 51/18 | (2022.01) |
| H04L 67/55 | (2022.01) |
| H04W 4/12 | (2009.01) |

(52) U.S. Cl.
CPC .......... *H04L 63/1483* (2013.01); *H04L 51/18* (2013.01); *H04L 67/55* (2022.05); *H04W 4/12* (2013.01)

(58) Field of Classification Search
CPC ..... H04L 63/1483; H04L 67/55; H04L 51/18; H04W 4/12
See application file for complete search history.

(56) References Cited

U.S. PATENT DOCUMENTS

| 7,899,866 | B1* | 3/2011 | Buckingham | H04L 51/212 |
| | | | | 709/206 |
| 9,781,149 | B1* | 10/2017 | Himler | H04L 63/1425 |
| 10,158,677 | B1* | 12/2018 | DiCorpo | H04L 63/145 |
| 10,601,865 | B1* | 3/2020 | Mesdaq | H04L 63/1425 |
| 11,368,475 | B1* | 6/2022 | Vashisht | G06F 16/9535 |
| 2008/0177994 | A1* | 7/2008 | Mayer | G06F 16/00 |
| | | | | 709/224 |
| 2008/0222728 | A1* | 9/2008 | Chavez | H04L 51/212 |
| | | | | 726/24 |
| 2012/0117161 | A1* | 5/2012 | Best | H04L 51/214 |
| | | | | 709/206 |
| 2017/0200015 | A1* | 7/2017 | Gonzalez | H04L 63/1408 |
| 2018/0198799 | A1* | 7/2018 | Parthasarathy | H04L 63/123 |
| 2019/0014149 | A1* | 1/2019 | Cleveland | G06N 3/045 |
| 2020/0145458 | A1* | 5/2020 | Kumar | G06F 21/56 |

* cited by examiner

Primary Examiner — Joseph R Maniwang
(74) Attorney, Agent, or Firm — Patent Capital Group

(57) ABSTRACT

There is disclosed a method of providing passive phishing remediation for an enterprise, including: displaying, to a user of a mobile device, an email; receiving from the user a one-click request to perform additional analysis of the email; providing the email to a phishing mitigation service; assigning the email a reputation score, generating a human-readable reputation display for the email, wherein the human-readable reputation display includes at least three grades comprising safe, unknown or unreliable, and unsafe or malicious; and providing the human-readable reputation display as a push notification to the mobile device.

20 Claims, 14 Drawing Sheets

PHISHING MITIGATION SERVICE

CROSS-REFERENCE TO RELATED APPLICATIONS

This application is a continuation of U.S. application Ser. No. 16/704,918, titled "Phishing Mitigation Service," filed 5 Dec. 2019, which is incorporated herein by reference in its entirety.

FIELD OF THE SPECIFICATION

This application relates in general to computer security, and more particularly, though not exclusively, to a system and method of providing a phishing mitigation service.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
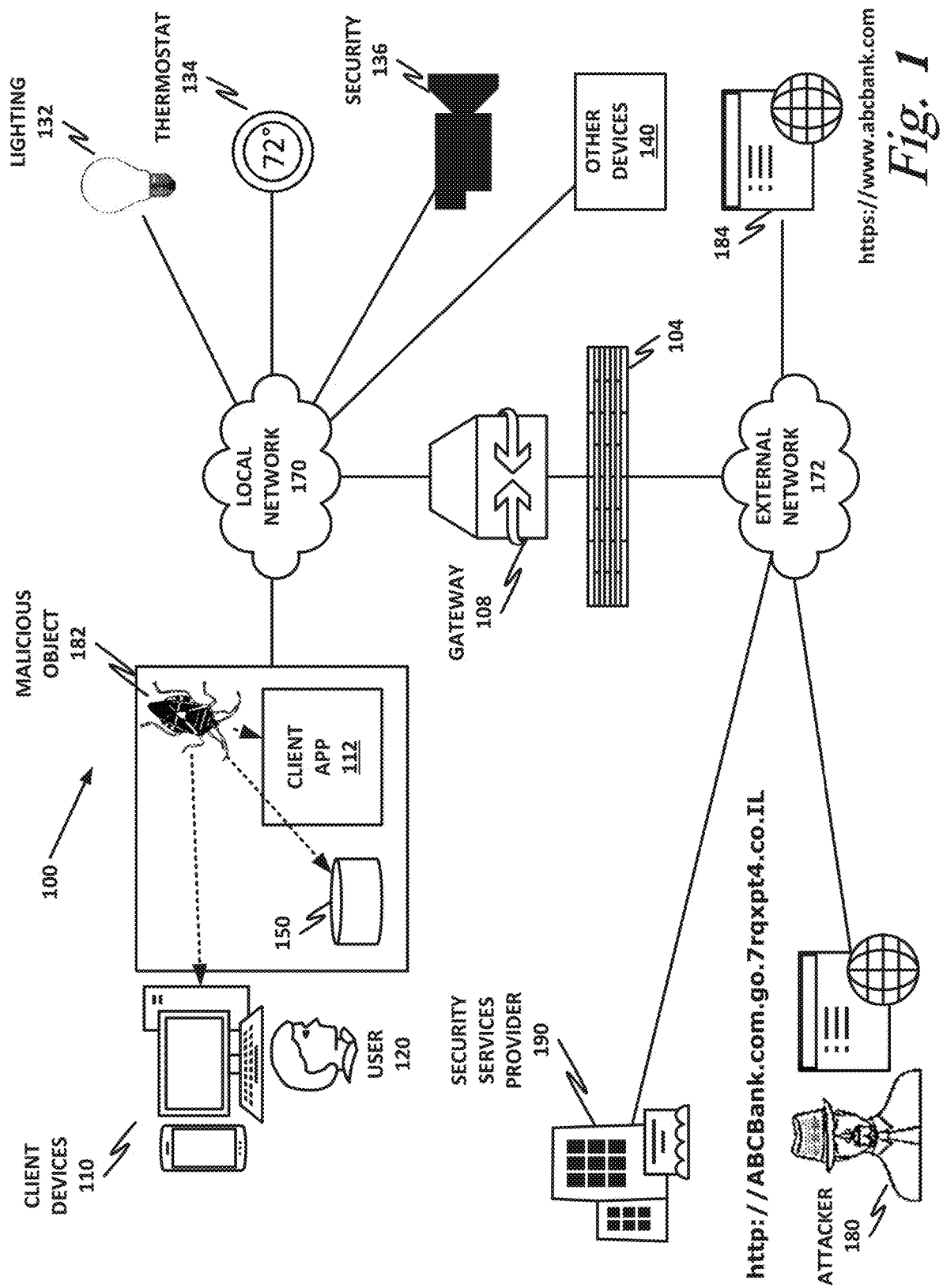
FIG. 1 is a block diagram illustrating selected elements of a security ecosystem.

There is disclosed a method of providing passive phishing remediation for an enterprise, including: displaying, to a user of a mobile device, an email; receiving from the user a one-click request to perform additional analysis of the email; providing the email to a phishing mitigation service; assigning the email a reputation score, generating a human-readable reputation display for the email, wherein the human-readable reputation display includes at least three grades comprising safe, unknown or unreliable, and unsafe or malicious; and providing the human-readable reputation display as a push notification to the mobile device.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Phishing is an important threat to both enterprise and home computer users. Phishing is the use of targeted e-mails and/or webpages that try to induce users into providing personal information, such as usernames, passwords, credit card data, Social Security number, tax information, or other sensitive data. In an illustrative phishing attack, the attacker sends out a mass e-mail blast to a large number of e-mail addresses. While traditional e-mail spam is merely annoying, phishing e-mails are more dangerous. The phishing e-mail may use logos, fonts, backgrounds, and other visual elements selected from popular websites and services. This creates a very sophisticated visual decoy that superficially appears to originate from the actual service. For example, a user may receive an unsolicited e-mail that appears to be from Netflix. The e-mail may "warn" the user that his Netflix account has a problem, and he needs to log back in and correct his credit card information to resume service.

If the user clicks on the link in the e-mail, he is directed to a phishing website. The phishing website may closely mimic the Netflix login page, and when the user enters his Netflix credentials, the attacker has now collected a valid Netflix login. Even worse, the user is directed to a page that closely mimics the Netflix payment information page. This page indicates that the user's credit card has expired, or that there has been an issue, and requests that the user enter a valid credit card. When the user enters a credit card, the attacker now has a valid credit card number, password, and security code that can be used for identity theft. This identity theft can continue until the user discovers the problem and cancels the credit card.

Other attacks are targeted at accessing online banking credentials, Social Security numbers, and other sensitive data that can be used for identity theft, or for theft of financial services.

In the early days of the internet, phishing attacks were less sophisticated, and only the highly credulous were generally susceptible to them. However, as users became more savvy, phishing attacks became more sophisticated, and it can now be very difficult for even a skeptical user to detect phishing e-mails, or to separate phishing e-mails from non-phishing e-mails.

Because phishing represents a substantial danger to personal and enterprise data, it is beneficial to provide consumer grade and enterprise level phishing mitigation services via a security services provider. Currently, there are a number of existing techniques for identifying a phishing e-mail programmatically, such as regular expression matching, machine learning, visual identification, and others. However, these detection mechanisms are only as useful as a user's access to them. A phishing detection algorithm with a 100% detection rate and a 0% false positive rate is nevertheless of little benefit to the user if the user does not provide suspicious e-mails or uniform resource locators (URLs) for analysis.

Indeed, user inertia may represent the single greatest attack surface for phishing attacks, particularly in cases where sophisticated phishing detection is available to the user.

If the user thinks of it as a "hassle" to access the phishing service, or simply is unaware that a phishing mitigation service is available, then even the greatest and most effective phishing detection engine in the world may be of little benefit.

Embodiments of the present specification take advantage of the large number of phishing mitigation engines and techniques available. Indeed, the teachings of this specification are generally applicable to any effective phishing detection engine. There are described herein embodiments of user interfaces that simplify the user's task in accessing such phishing mitigation engines. Providing ease of access for phishing mitigation engines helps to mitigate the issue of user inertia. Indeed, in some embodiments, the user need take no proactive action at all. If the phishing mitigation engine is given access to the user's inbox, then new e-mails can be scanned as they arrive. If an e-mail is identified as a phishing e-mail, it can be deleted, quarantined, placed in a spam folder, or otherwise marked as dangerous. In this case, the user may never see or interact with the phishing e-mail. In other embodiments, even if the user does not grant the security services vendor direct access to the user's inbox, the user may have access to phishing detection via a one-click interface, or an interface that requires very few interactions.

The teachings herein provide an easy way to ensure that customers and clients of a security services vendor do not accidentally open malware attachments or click on links in phishing e-mails. This is particularly beneficial for less sophisticated users who can easily check the authenticity of an e-mail. If the steps involved in checking an e-mail for phishing content are relatively simple and repetitive, then users can be easily trained to automatically check any e-mail that could potentially be dangerous before clicking on any links. For example, if the interaction is relatively simple and straightforward, then users may be trained or conditioned to perform a phishing check any time they receive an e-mail from their banking service, or an e-mail that purports to be from their banking service. Similarly, they can be conditioned to automatically check any time they receive an e-mail from an online or e-commerce site, an e-pay site, or any other service that may be a tempting target for phishing attacks. When the phishing check is conditioned as an automatic response to receiving any such potentially dangerous e-mail, the efficacy of the phishing mitigation engine is greatly increased. As discussed above, conditioning this response is most effective when the required response is simple, straightforward, and requires relatively few steps.

The present specification discloses a plurality of embodiments, including an active monitoring embodiment, a passive monitoring embodiment based on e-mail forwarding, and a passive monitoring option based on a vendor supplied e-mail agent, application, and/or plugin. The foregoing embodiments are provided by way of illustrative and non-limiting example only, and other active and passive monitoring embodiments could be provided within the scope of the present disclosure.

An active monitoring solution is beneficial in that it requires no interaction with the user at all. In this example, the user may provide her e-mail address and password for an online e-mail service to the security services vendor. For example, user Jane may have e-mail address "jane@mailme.com." For purposes of this example, it is assumed that mailme.com is a popular e-mail service with a post office protocol (POP) or internet message access protocol (IMAP) interface. Because user Jane is concerned about the possibility of phishing, Jane provides her e-mail address and her login credentials to the security services vendor.

The security services vendor may then monitor Jane's inbox for new incoming e-mails. In one example, for each and every incoming e-mail, the service copies the e-mail (e.g., without marking it as "red" or "opened"). The service then decomposes the e-mail and discards all content except for URLs and attachments. The phishing mitigation engine may then call a malware engine to scan each attachment for malicious content.

Discarding all content except for the URL and the attachments is one illustrative and nonlimiting example. In other embodiments, the content of the e-mail itself may be used for phishing detection. By way of nonlimiting example, some phishing detection engines use the content of the e-mail itself to detect suspicious activity, such as by looking at the fonts, logos, and other visual indicators that are used to trick the user into thinking that the e-mail is from a particular source. For example, if the e-mail uses the fonts, header, images, and colors of a well-known banking website, this may be an indication that the e-mail is a phishing e-mail.

Furthermore, the phishing mitigation engine may query a cloud reputation service, such as Global Threat Intelligence (GTI) by MCAFEE, LLC, for each URL. If any attachment is found to be malicious, and/or a URL is found to be phishing/red/yellow, then appropriate action may be taken such as alerting the user, deleting the e-mail, tagging the e-mail, and/or alerting the e-mail vendor that the e-mail is bad. If the e-mail is not found to be bad, then it is simply left in the inbox in an unopened state, ready for Jane to retrieve the next time she logs into her webmail or downloads her e-mail via POP or IMAP. In this example, Jane may gain the benefit of a sophisticated phishing analysis engine without having to take any active steps herself, except for initially providing her e-mail credentials to the security services vendor.

Depending on the user's privacy consciousness, the sensitivity of the e-mail address, and other security and privacy factors, this solution may or may not be desirable for the user. For example, Jane may have a number of e-mail addresses with varying levels of sensitivity. Jane may not feel comfortable providing credentials for her personal e-mail address (jane@mailme.com), in which she discusses highly personal matters with friends and family. On the other hand, Jane may have another e-mail address that she uses mostly for public mailing lists and other, less sensitive purposes (jane_list@mailme.com). She may be comfortable providing the credentials for this e-mail address to the security services vendor.

Note that in the case of an enterprise, the end user may not have an option as to whether the e-mail inbox is scanned. In the case of an enterprise e-mail (e.g., jane@bigenterprise.com), all incoming e-mails may be automatically subjected to this phishing analysis.

In the case where a user is not comfortable providing e-mail credentials to the security services vendor for active monitoring, passive monitoring can nevertheless be provided. In the passive monitoring example, because the security services vendor does not have access to the user's unfiltered inbox, the user must take some proactive step to access the phishing service. In this case, it is advantageous to minimize the number of steps the user needs to take and to make the interactions as simple and straightforward as possible. If the interactions are easy, the user can be easily conditioned to mark for analysis any e-mail that has any potential of being malicious or of being a phishing e-mail.

In one embodiment, when the user installs a security agent on a personal device such as a laptop computer, desktop computer, smart phone, tablet, or similar, the installation requests access to the user's address book on the device. The purpose of this access is to ensure that the security agent can add an e-mail forwarding address (e.g., phishing@securityservice.com). When the user encounters a suspicious or potentially suspicious e-mail, the user can be conditioned to immediately forward the e-mail to the security services provider. If the installed address book entry has a straightforward and memorable alias (e.g., "PHISHING"), then it is very straightforward for the user to see the e-mail, click the FORWARD button, and type the word "PHISHING" into the "To:" line of the forwarded e-mail. After the user sends the forwarded e-mail, the user quickly (e.g., within a matter of a few seconds) receives a response e-mail indicating whether the forwarded e-mail is safe or not. Advantageously, this interaction requires little effort from the end user, is a response that is easy to condition into the end user, and provides instantaneous feedback (on human perceptible timescales) regarding the e-mail.

On the backend, the interaction may be very similar. The forwarded e-mail is received by the phishing@securityservice.com e-mail address, and a phishing and malware detection engine immediately processes the e-mail, such as by discarding content except for attachments and URLs, querying a cloud reputation service for URL reputations, scanning attachments for malware, and providing a reputation for the e-mail. With appropriately configured computing resources, all of these tasks can be performed on timescales below what is generally considered human perceptible. Therefore, the response e-mail can be sent with the appropriate reputation in a timeframe of less than a few seconds.

In another example of passive monitoring, the user installs an e-mail application from the security services vendor, or installs a plugin to a native e-mail application. This plugin or e-mail application may provide a single-click reputation request facility. For example, if the user has an e-mail selected as her current e-mail, the user interface may provide a single button for "check reputation." If the user clicks the check reputation button, then the content of the e-mail is provided to the security services provider, and the e-mail is checked for malware or phishing indicators. The user may then receive a pop-up or a "push" notification on her device indicating whether the e-mail is good or whether it is a phishing e-mail. This one-click reputation request again has the advantage of being very straightforward, and thus easy to condition the user to do. Any time the user sees an e-mail purporting to be from her bank, from an e-commerce site, or from some other source that may request sensitive information, the user can be conditioned to simply click the button to receive instant or near-instant notification of the reputation for the e-mail. This allows the user to either discard the e-mail or open the e-mail, executing either action with a high degree of confidence.

A system and method for providing a phishing mitigation service will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram illustrating selected elements of a security ecosystem 100. Embodiments of security ecosystem 100 may be configured or adapted to provide a phishing mitigation service, as disclosed in the present specification.

In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

In some examples, attacker 180 may deliver malicious object 182 via e-mail, or by otherwise directing user 120 to the malicious website.

Gateway 108 may, in some embodiments, include mechanisms to protect client devices 110 from attacker 180. For example, gateway 108 may have a phishing website detection engine that is designed to check for elements similar to how a seasoned human user may verify a phishing website. This is beneficial, because not all users are experts in identifying phishing sites. Furthermore, cyber criminals may be very intelligent or sophisticated, and may be able to convince all but the most seasoned and experienced users to provide the requested details. The provision of a phishing website mitigation engine within gateway 108 can help to protect from this damage.

The phishing website mitigation engine of gateway 108 may use a headless browser to identify a phishing website that has not yet been encountered within the enterprise. Performance may be enhanced by relying on URL reputations as a first pass check for whether a website is already known. In some embodiments, the phishing website mitigation engine of gateway 108 may verify website attributes and provide a mapping of aspects, such as a company's logo, to a suspected website. This can provide very high accuracy in identifying a phishing website.

This approach realizes advantages, because targeted phishing attacks tend to be short-lived, with a time to live on the order of approximately four hours. This makes it difficult to mitigate such attacks via web crawlers, which take on the order of approximately two days to identify a new phishing website. By the time the website is identified, it may already be stale, and may have moved to a different URL.

This also realizes advantages over some existing web controllers that only block risky sites. While this may be a reasonable approach for some contexts—the fact that a site has never been encountered does not per se indicate that it is malicious—it does leave users vulnerable. In particular, these solutions do not provide real-time detection of phishing websites.

Enterprises may spend a great deal of money training employees, but even with training, the majority of users fail to identify actual attacks when they happen. The phishing mitigation service of the present specification also realizes advantages over solutions that use regular expressions and pattern matching, or other machine learning methods that are error-prone in detecting phishing attacks.

In embodiments of the present disclosure, there is no need to depend on external sources or inputs to detect a phishing site. The customer can customize a scanning process by whitelisting certain URLs and blacklisting other URLs. Detection is provided in real-time, and the accuracy rate is very high compared to some other solutions. This can, therefore, achieve high performance and is relatively less false-positive prone than some existing solutions.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects may be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

In one example, attacker 180 may operate a phishing website at the URL http://abcbank.com.go.7rqxpt4.co.IL. User 120 is a customer of ABC Bank, and regularly uses client devices 110 to access website 184 which provides services for ABC Bank, namely at the URL https://www.abcbank.com.

To try to compromise personally identifying information (PII), account information, or other sensitive information from user 120, attacker 180 may design the false website to be visually very similar to the homepage, a login page, or other portion of legitimate website 184. Thus, attacker 180 may have as one goal to induce user 120 to visit http://abcbank.com.go.7rqxpt4.co.IL. For example, attacker 180 may provide the link in an e-mail, as a phishing advertisement, or by some other mechanism to try to get user 120 to click on the link. When user 120 sees the link, he may see "abcbank.com," gloss over the rest of the URL, and assume that this is a legitimate website. If user 120 is sufficiently credulous, he may attempt to log into the false website, and thus provide his username and password to attacker 180. Furthermore, he may be tricked into providing other useful information, such as an account number, a birthday, answers to security questions, or other sensitive information.

Figure 2:
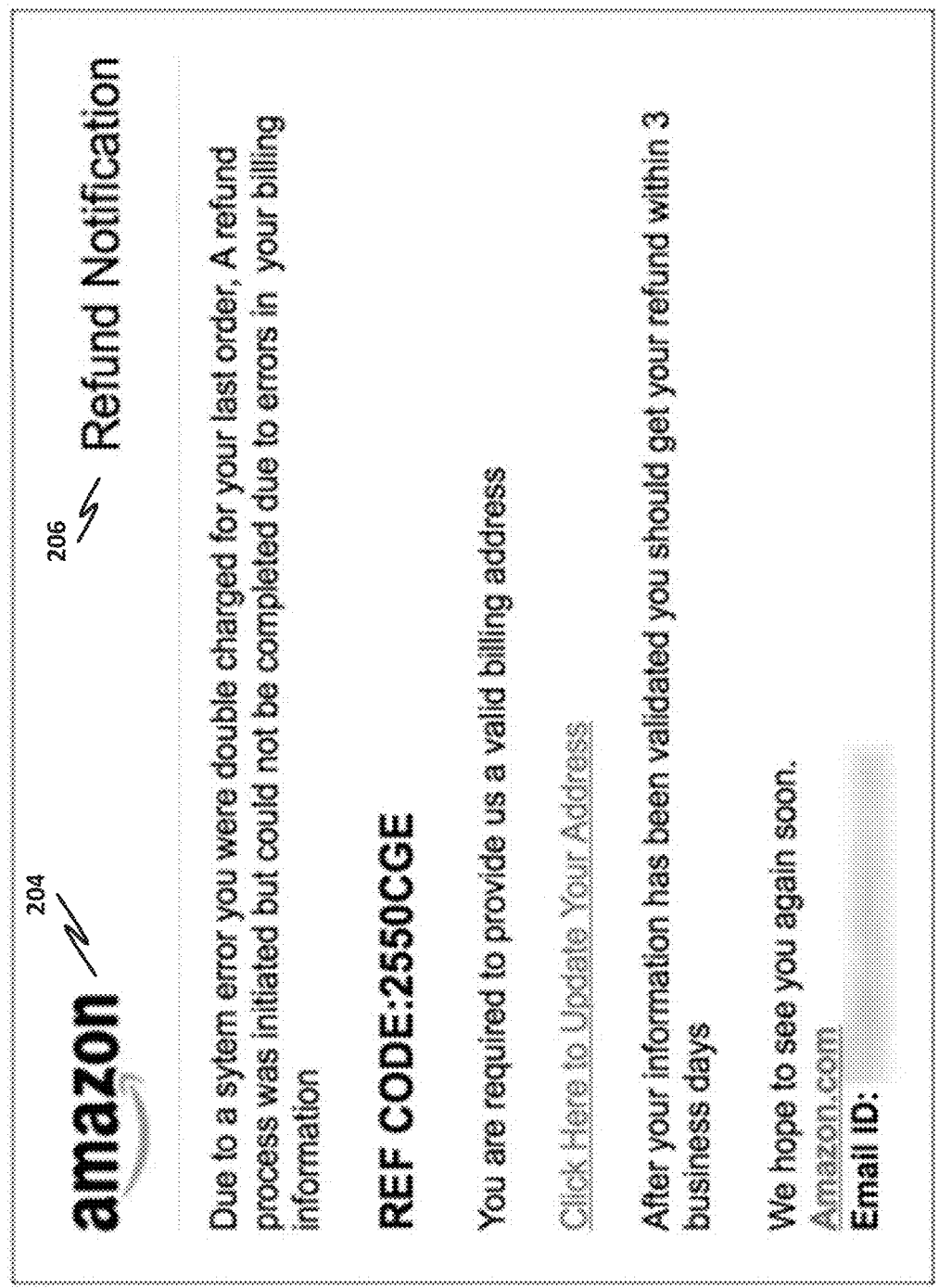
FIG. 2 is a block diagram illustrating a potential phishing e-mail.

FIG. 2 is a block diagram illustrating a potential phishing e-mail 200. Potential phishing e-mail 200 is an e-mail purportedly from Amazon.com, a popular e-commerce site. When displayed in an e-mail reader with Rich Text or HTML capabilities, e-mail 200 is displayed graphically, including an Amazon logo 204. E-mail 200 may also use Amazon fonts and Amazon colors that may appear familiar to an experienced user of the Amazon website.

If a user is unwary, it may be tempting to click on links in e-mail 200. For example, the use of Amazon logo 204, along with Amazon fonts and Amazon colors, creates a feeling of trust that this is, in fact, an e-mail from Amazon. Furthermore, the e-mail indicates: "Due to a system error you were double charged for your last order, A refund process was initiated but could not be completed due to errors in your billing information"

While a savvy user may read this carefully and realize that there are grammatical and punctuation errors unlikely to occur in an official e-mail from Amazon.com (which is most likely to have been professionally copyedited), a less wary user may focus simply on the content, which promises a refund for a double charge on an unspecified "last order." The illusion is aided by the prominent refund notification 206 in the upper right of e-mail 200.

The e-mail then indicates that the user must provide a valid billing address, and provides a link for the user to click on to update billing information. The e-mail promises that after the user information has been validated, the refund will be issued within three business days.

In this case, there are some facial indicators that the e-mail is probably not legitimate. For example, the poor punctuation of the notification text indicates that this e-mail was not properly copyedited, and in fact may have been originated by a person who is not a native English speaker (as is often the case among e-mail scammers). However, one of the best indicators of a phishing scam is that the link will not direct to the official secure sockets layer (SSL) Amazon.com website. In this case, however, the user cannot immediately see the address of the link, as it is hidden behind the HTML code that provides the link. In many operating systems, such as those for desktop computers, the user may be able to hover over the link and see which address it redirects to. A savvy user may be able to recognize a deceptive link, but a less savvy user may have difficulty. Furthermore, in other operating systems, such as those for smart phones or tablets (which do not provide a mouse, but rather use a touch interface), there is not necessarily a hover capability, and it may be more difficult for the user to inspect the link address.

Figure 3:
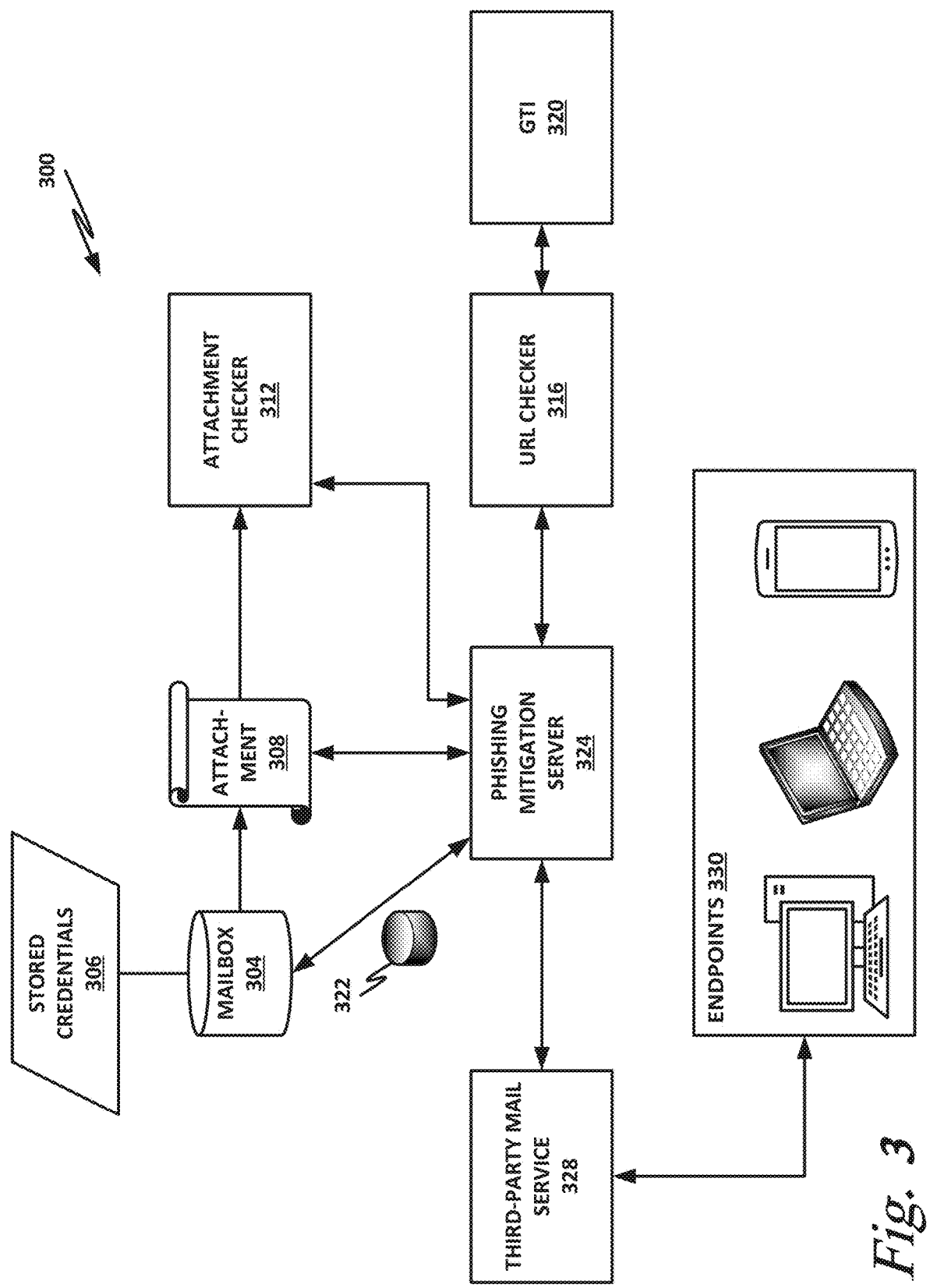
FIG. 3 is a block diagram of an active e-mail mitigation ecosystem.
Figure 4:
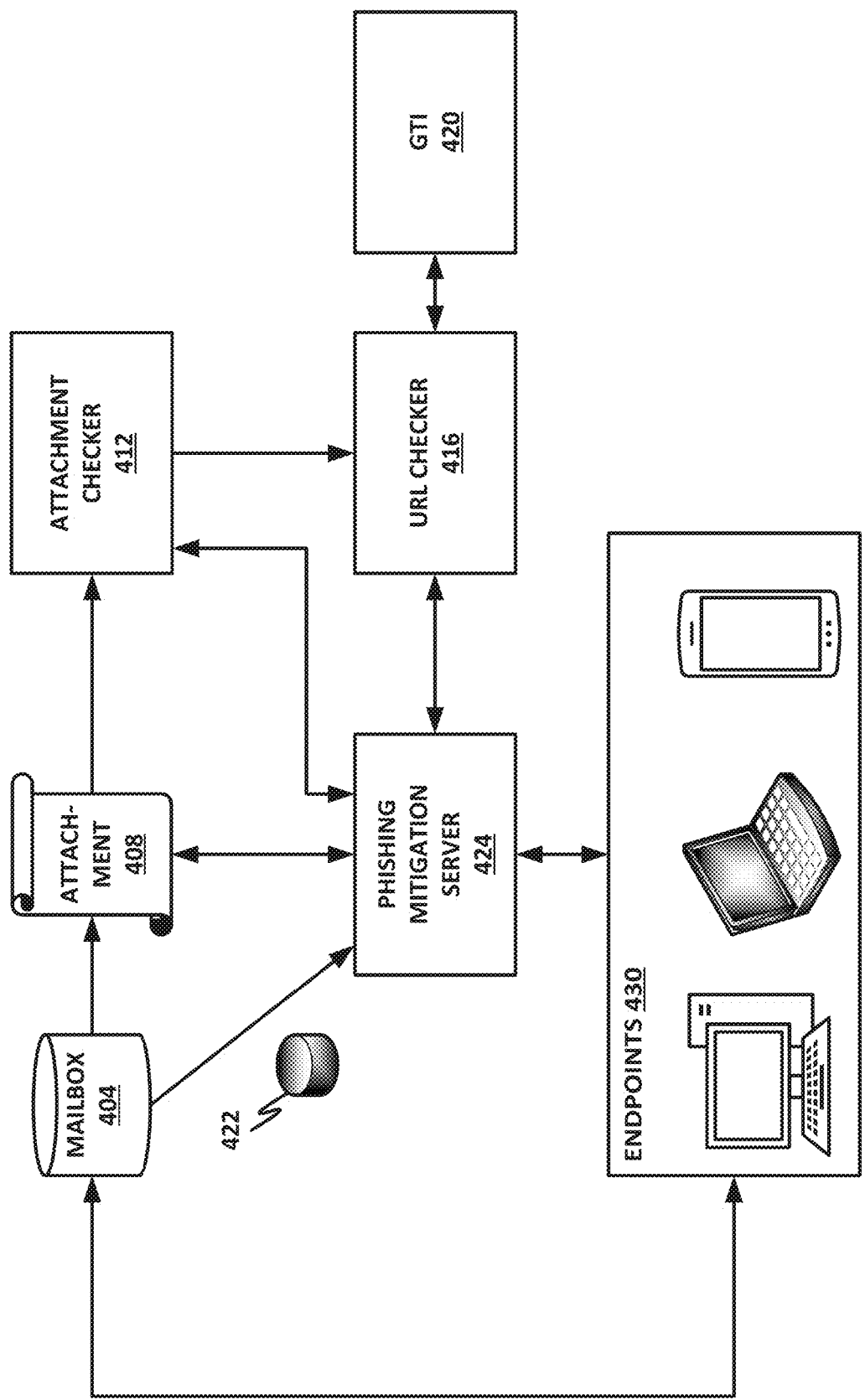
FIG. 4 is a block diagram of a passive e-mail mitigation ecosystem.

Thus, it is advantageous to provide a phishing and malware mitigation mechanism that the user can take advantage of with minimal interaction and/or with few required steps. In general, the fewer steps that are required, the more likely the user is to take advantage of the mechanism. FIGS. 3 and 4 below illustrate embodiments of active and passive malware mitigation ecosystems, respectively.

FIG. 3 is a block diagram of an active e-mail mitigation ecosystem 300. Within active system 300, a user has a mailbox 304 provided by a third-party mail service 328. The user may use endpoints 330 to check mailbox 304.

In this embodiment, the user contracts with a security services provider such as security services provider 190 of FIG. 1. To enable the security services provider to provide the e-mail mitigation ecosystem, the user may provide stored credentials 306, which the security services provider may use to access user mailbox 304.

The security services provider monitors mailbox 304 for new incoming mail. When a new e-mail is received with e-mail payload 322, the e-mail is analyzed by phishing mitigation server 324. Phishing mitigation server 324 copies the e-mail without deleting it or marking it as read. For example, phishing mitigation server 324 may have a POP e-mail client that downloads e-mails, but is configured to keep them on the server and not mark them as read. Phishing mitigation server 324 may perform some pre-processing on the e-mail, such as extracting one or more attachments 308, and performing some scanning on the e-mail, itself.

Attachments 308 may be analyzed by an attachment checker 312. Attachment checker 312 may provide antivirus and/or anti-malware scanning procedures that scan attachments to determine whether they are malicious. This could include, for example, using hashing and pattern matching recognition, using known malware signatures, fuzzy matching, string detection, or many other malware detection techniques available to a security services vendor.

Phishing mitigation server 324 also includes a URL checker 316 that queries a cloud service such as GTI 320 provided by MCAFEE, LLC for a reputation for any URLs found in links in the e-mail. Note that URL reputation scanning is only one available technique for detecting phishing or malicious e-mails. Other techniques include visual recognition, as well as checking for the use of suspicious URLs, the use of HyperText Transfer Protocol (HTTP) instead of HTTP Secure (HTTPS), the use of deceptive colors, fonts, logos, or other deceptive content, or any other suitable malware detection algorithm. Phishing mitigation server 324 makes a determination on e-mail payload 322 based on this analysis.

Phishing mitigation server 324 may assign e-mail payload 322 a score, which can be any suitable reputation score. In one example, it is assigned a reputation such as green, yellow, and/or red. A green reputation means that e-mail payload 322 is, with a high degree of confidence, a legitimate e-mail that the user need not be concerned about. A red reputation may indicate that the e-mail is, with high confidence, a phishing or malware e-mail, or malicious spam that may be harmful to the user. A reputation of yellow may indicate that the e-mail may be legitimate, but that it cannot be deemed safe with sufficiently high confidence.

It should be noted that the foregoing example of green, yellow, and red is merely an illustrative example. Other scoring mechanisms could be used, including an integer or floating point score, a percentage confidence, and/or a multidimensional score that assigns confidence on a number of different axes.

Depending on the reputation assigned by phishing mitigation server 324, appropriate action may be taken. For example, phishing mitigation server 324 may simply leave the e-mail alone if it is deemed good with a high confidence (e.g., "green"). If the e-mail is assigned a bad or malicious reputation with high confidence (e.g., "red"), it may simply be deleted from the user's inbox and/or moved to the user's spam folder, possibly with appropriate flags and warnings that this e-mail is considered to be malware with high probability. If the e-mail is ultimately assigned an unknown reputation (e.g., "yellow"), it may be kept in the user's inbox, but may be flagged yellow with a warning to the user that the system could not assign a sufficiently reliable reputation to the e-mail.

Thus, when the end user operates one or more endpoints to view her inbox with third-party mail service 328, the e-mail may simply not appear to the user, may appear normally, or may appear with a warning, depending on the reputation assigned by phishing mitigation server 324.

FIG. 4 is a block diagram of a passive e-mail mitigation ecosystem 400.

In this embodiment, when an end user operates one or more endpoints 430 to access mailbox 404, the user may identify one or more e-mails that are deemed to be suspicious, or in need of verification before the user feels comfortable opening them. As described above, training and conditioning may be beneficial to help the user spot e-mails that require more verification, and to reflexively seek verification for such e-mails. For example, the user may be trained or conditioned to request verification for any e-mail from a bank, e-commerce site, e-payment site, or other common phishing target or activity.

In some embodiments, the user may initiate verification by, for example, forwarding e-mail payload 422 to an e-mail address operated by phishing mitigation server 424, clicking on a button that is provided by an e-mail client or plugin to an e-mail client, or taking some other action to bring the e-mail to the attention of phishing mitigation server 424. Phishing mitigation server 424 may perform some pre-processing on the e-mail, such as extracting one or more attachments 408, and performing some scanning on the e-mail, itself.

Attachments 408 may be analyzed by an attachment checker 412. Attachment checker 412 may provide antivirus and/or anti-malware scanning procedures that scan attachments to determine whether they are malicious. This could include, for example, using hashing and pattern matching recognition, using known malware signatures, fuzzy matching, string detection, or many other malware detection techniques available to a security services vendor.

Phishing mitigation server 424 also includes a URL checker 416 that queries a cloud service such as GTI 420 provided by MCAFEE, LLC for a reputation for any URLs found in links in the e-mail. Note that URL reputation scanning is only one available technique for detecting phishing or malicious e-mails. Other techniques include visual recognition, as well as checking for the use of suspicious URLs, the use of HyperText Transfer Protocol (HTTP) instead of HTTPS, the use of deceptive colors, fonts, logos, or other deceptive content, or any other suitable malware detection algorithm. Phishing mitigation server 424 makes a determination on e-mail payload 422 based on this analysis.

Phishing mitigation server 424 may assign e-mail payload 422 a score, which can be any suitable reputation score. This reputation may then be provided to an endpoint for a user to see, and thus determine whether to interact with the e-mail. In one example, it is assigned a reputation such as green, yellow, and/or red. A green reputation means that e-mail payload 422 is, with a high degree of confidence, a legitimate e-mail that the user need not be concerned about. A red reputation may indicate that the e-mail is, with high confidence, a phishing or malware e-mail, or malicious spam that may be harmful to the user. A reputation of yellow may indicate that the e-mail may be legitimate, but that it cannot be deemed safe with sufficiently high confidence.

It should be noted that the foregoing example of green, yellow, and red is merely an illustrative example. Other scoring mechanisms could be used, including an integer or floating point score, a percentage confidence, and/or a multidimensional score that assigns confidence on a number of different axes. Depending on the reputation assigned by phishing mitigation server 424, the user may take appropriate action according to personal preference and/or risk tolerance.

Figure 5:
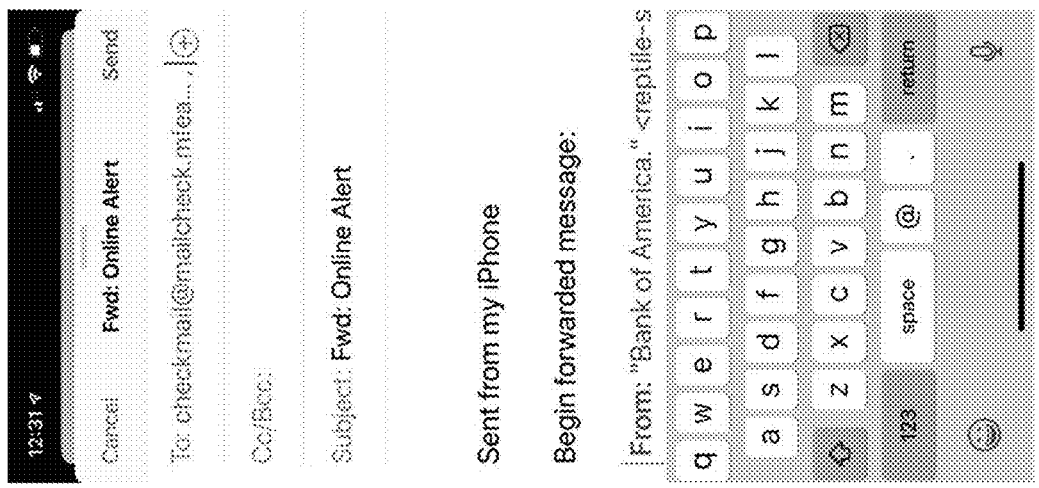
FIG. 5 is a block diagram illustration of a user e-mail interaction.

FIG. 5 is a block diagram illustration of a user e-mail interaction 500. In this example, a user receives an e-mail called "Online Alert," purportedly from Bank of America. In this case, if passive monitoring is used, the user may forward the e-mail to an e-mail address such as checkmail@mailcheck.provider.com. The user forwards the e-mail, and then receives in response either an e-mail from the service, or optionally a system notification such as a pop-up or push notification.

Figure 6:
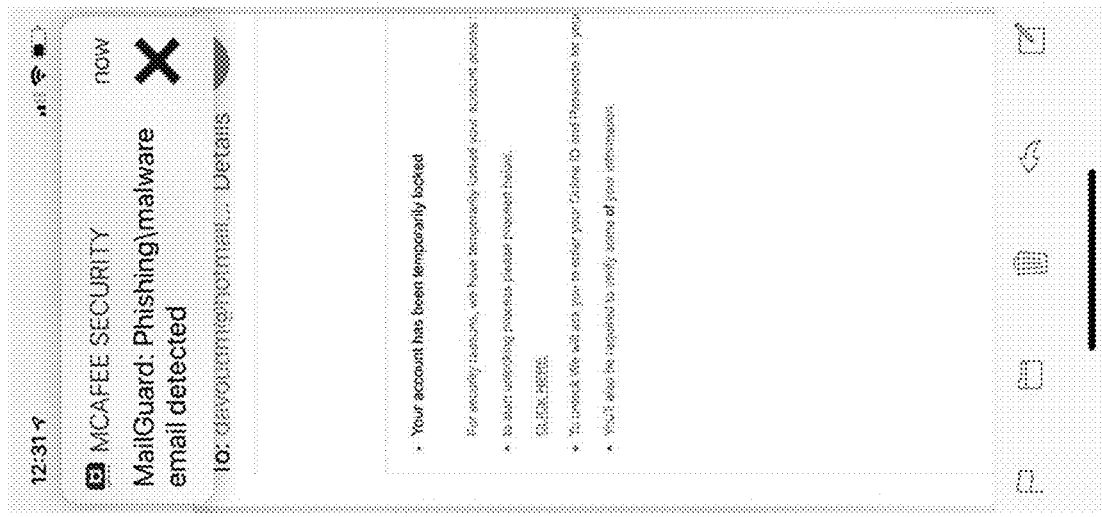
FIG. 6 illustrates detection of a phishing or malware e-mail.

FIG. 6 illustrates detection of a phishing or malware e-mail. As illustrated in the block diagram of FIG. 6, the pop-up or push notification indicates to the user that the forwarded e-mail has been detected as a phishing or malware e-mail. In this case, the user should delete the e-mail and have no further interaction with it.

Figure 7:
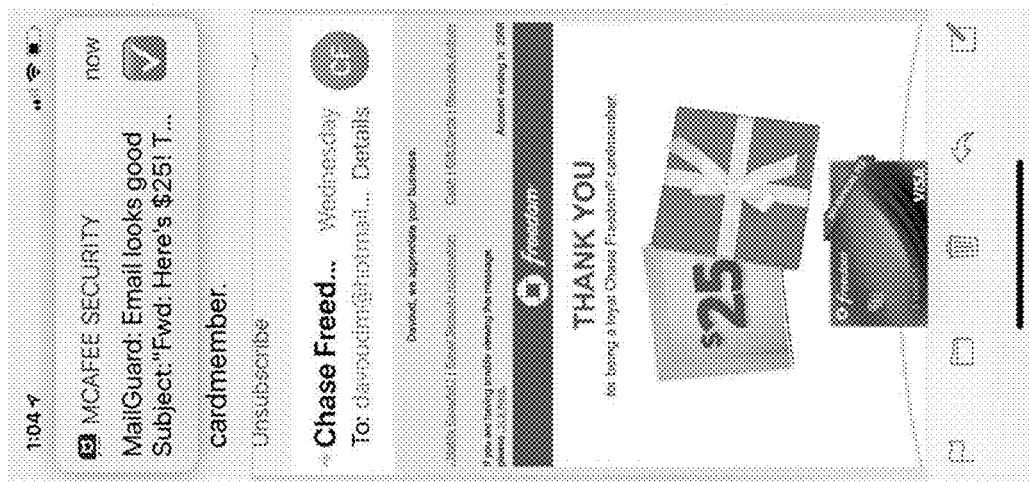
FIG. 7 illustrates a user encounter with a suspicious e-mail.

FIG. 7 illustrates a user encounter with a suspicious e-mail 700, this one purportedly from Chase Bank and claiming to provide a $25 gift or benefit to the user as a reward for being a loyal customer of Chase Bank. In this case, the user forwards the e-mail to the e-mail mitigation service and receives a notification from the service that the e-mail is good and legitimate, and that the user can safely interact with it. In this case, the user can safely claim the $25 reward from Chase Bank and can feel secure that no information is being collected by an e-mail scammer.

Figure 8:
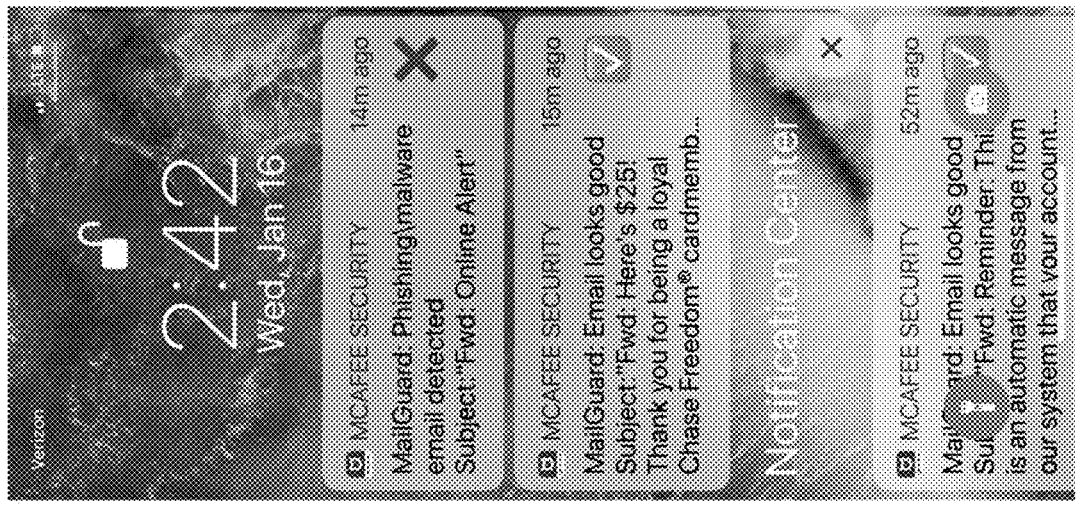
FIG. 8 is a block diagram of a user home screen, lock screen, or notification center in which the user has requested verification for a number of e-mails.

FIG. 8 is a block diagram of a user home screen, lock screen, or notification center in which the user has requested verification for a number of e-mails. In this case, one e-mail sent 14 minutes ago was identified by the mail guard as being a phishing or malware e-mail, and the user should delete the e-mail. Two other e-mails, one sent 15 minutes ago and the other sent 52 minutes ago, were identified as good e-mails. In this case, the user can freely and safely interact with the e-mails.

It should be noted that FIGS. 5 through 8 illustrate an embodiment where the forwarding function is used as a passive monitoring operation. In other examples, the user may opt to receive push notifications in an active monitoring scenario, such as when a phishing e-mail has been detected in the user's inbox. In yet other embodiments, the user's e-mail agent may be provided by the security services provider and have a one-click functionality for checking the status of the e-mail, or may have a plugin that provides a one-click functionality on a native or third-party e-mail client.

Figure 9:
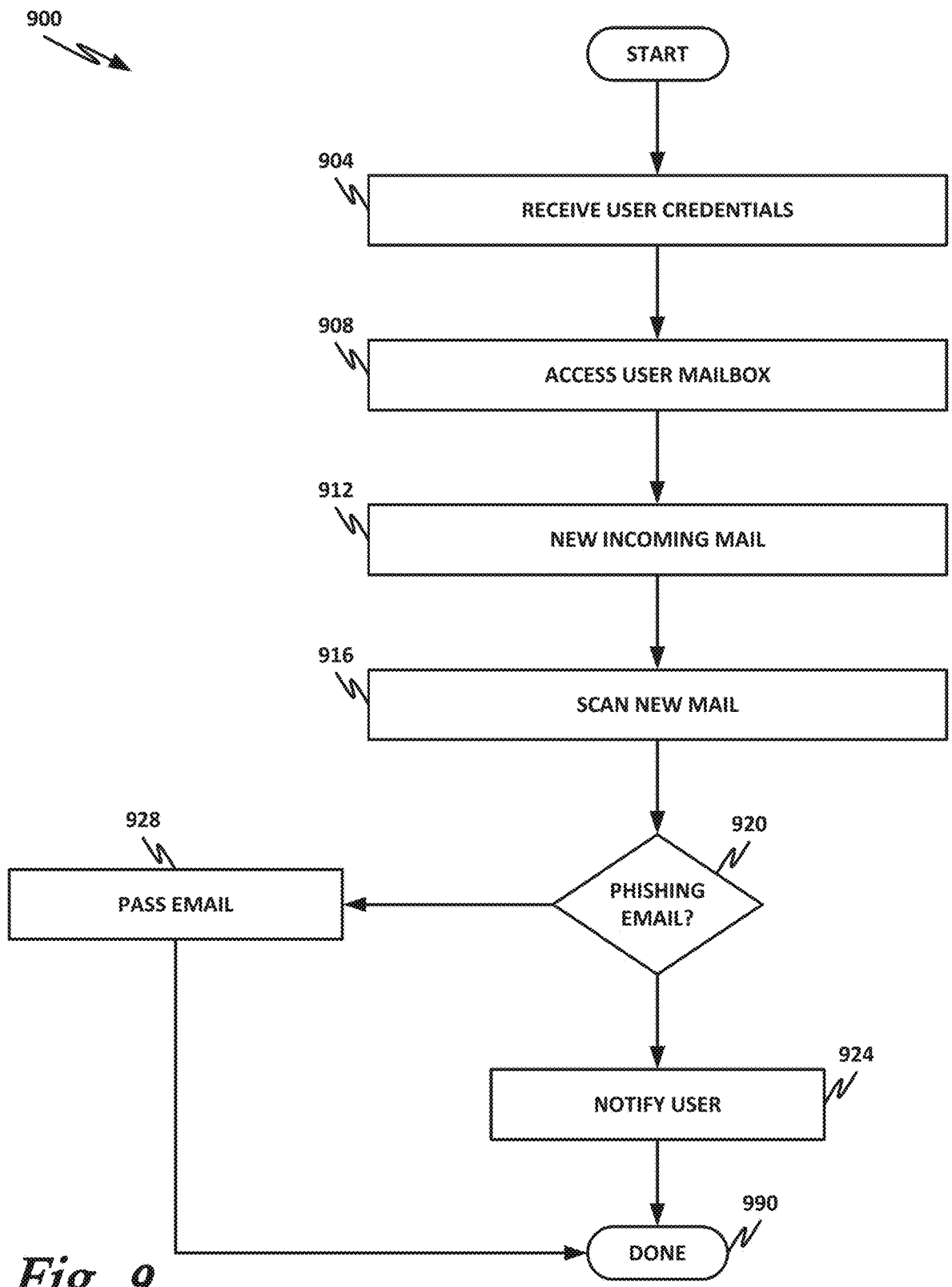
FIG. 9 is a flowchart of a method of performing e-mail mitigation.

FIG. 9 is a flowchart of a method 900 of performing e-mail mitigation.

In block 904, the e-mail mitigation server receives the user's credentials and stores them. It should be noted that this anticipates an active monitoring embodiment, wherein the user provides stored e-mail credentials.

In block 908, the service accesses the user's mailbox to check for new incoming mail.

In block 912, the service detects a new incoming mail. Note that again, the blocks above anticipate an active monitoring situation with stored user credentials. In other embodiments, other mechanisms could be used to receive e-mail. For example, a partnership could be entered into with popular e-mail services, wherein those e-mail services contract with the security services provider to provide scanning of user inboxes for phishing and malware e-mails. This can be done without providing user credentials for end users to the security services provider, and steps may be taken to ensure that no personal information or e-mails are stored on the server, so that user privacy is not compromised. In other embodiments, the e-mail may be received via e-mail forwarding, with a one-click functionality such as a button in a custom e-mail client or a plugin to a native e-mail client, or via some other mechanism.

In block 916, the system scans the new incoming e-mail to determine whether it is a malicious or phishing e-mail. This could be done via, for example, ecosystem 300 of FIG. 3 or ecosystem 400 of FIG. 4.

In decision block 920, the e-mail mitigation system determines whether the e-mail under inspection is a phishing or malicious e-mail.

If the e-mail is determined with sufficient confidence to not be malicious or a phishing e-mail, then in block 928, the e-mail is simply passed, such as by providing a user a pop-up or push notification via the notification center of the user's mobile device, providing a response e-mail, providing a desktop notification, or simply leaving the e-mail alone in an active monitoring solution.

Returning to decision block 920, if the e-mail is determined to be a phishing e-mail, then in block 924, the system notifies the user. This may be accomplished via a response e-mail, a push notification on the user's mobile device, a desktop notification on a desktop device, deleting the e-mail in an active monitoring situation, flagging the e-mail if the e-mail has a yellow reputation, or taking some other action to notify the user that the e-mail is suspicious.

In block 990, the method is done.

Figure 10:
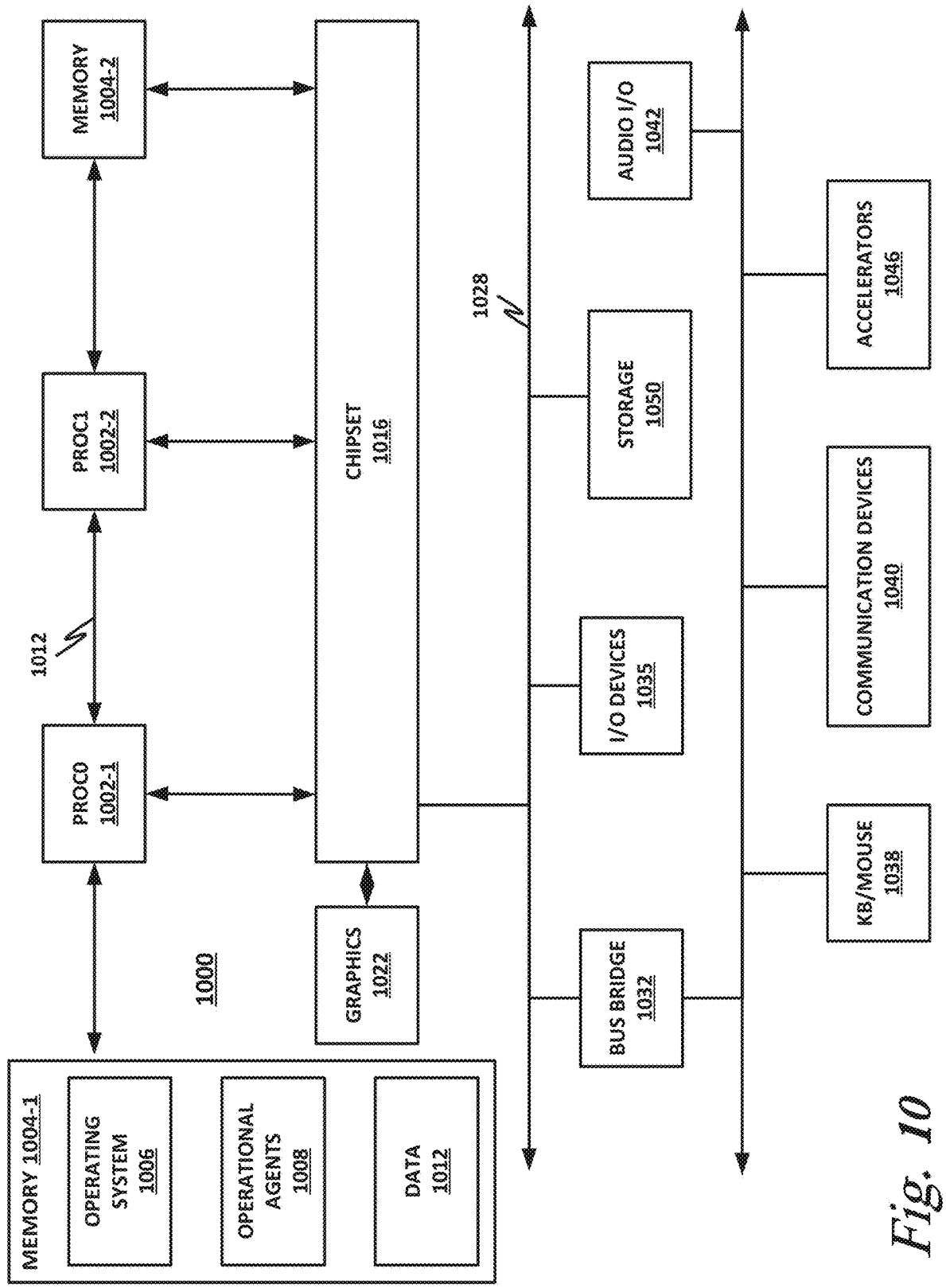
FIG. 10 is a block diagram of selected elements of a hardware platform.

FIG. 10 is a block diagram of a hardware platform 1000.

In at least some embodiments, hardware platform 1000 may be configured or adapted to provide a phishing mitigation service, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1000, even though they may be scattered across a data center, or even located in different data centers.

Hardware platform 1000 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1000 is arranged in a point-to-point (PtP) configuration. This PtP configuration is popular for personal computer (PC) and server-type devices, although it is not so limited, and any other bus type may be used.

Hardware platform 1000 is an example of a platform that may be used to implement embodiments of the teachings of this specification. For example, instructions could be stored in storage 1050. Instructions could also be transmitted to the hardware platform in an ethereal form, such as via network interface 1048, or retrieved from another source via any suitable interconnect. Once received (from any source), the instructions may be loaded into memory 1004, and may then be executed by one or more processor 1002 to provide elements such as an operating system 1006, operational agents 1008, or data 1012.

Figure 12:
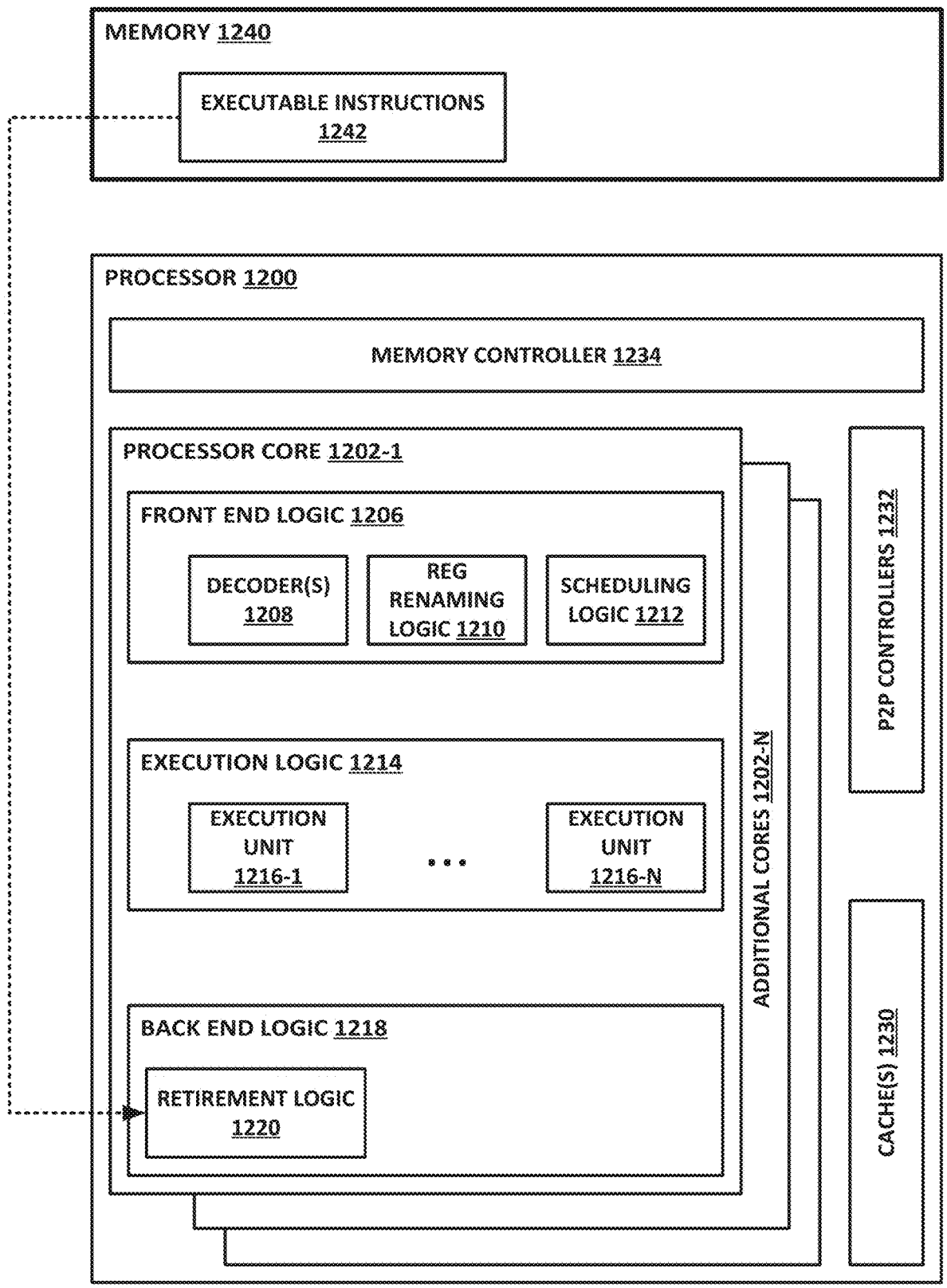
FIG. 12 is a block diagram of selected elements of a processor.

Hardware platform 1000 may include several processors 1002. For simplicity and clarity, only processors PROC0 1002-1 and PROC1 1002-2 are shown. Additional processors (such as 2, 4, 8, 16, 24, 32, 64, or 128 processors) may be provided as necessary, while in other embodiments, only one processor may be provided. Details of processors 1002 are not illustrated in this FIGURE, but one embodiment is illustrated in FIG. 12. Processors may have any number of cores, such as 1, 2, 4, 8, 16, 24, 32, 64, or 128 cores.

Processors 1002 may be any type of processor and may communicatively couple to chipset 1016 via, for example, PtP interfaces. Chipset 1016 may also exchange data with other elements, such as a high-performance graphics adapter 1022. In alternative embodiments, any or all of the PtP links illustrated in FIG. 10 could be implemented as any type of bus, or other configuration rather than a PtP link. In various embodiments, chipset 1016 may reside on the same die or package as a processor 1002 or on one or more different dies or packages. Each chipset may support any suitable number of processors 1002. A chipset 1016 (which may be a chipset, uncore, Northbridge, Southbridge, or other suitable logic and circuitry) may also include one or more controllers to couple other components to one or more central processor units (CPUs).

Two memories, 1004-1 and 1004-2 are shown, connected to PROC0 1002-1 and PROC1 1002-2, respectively. As an example, each processor is shown connected to its memory in a direct memory access (DMA) configuration, though other memory architectures are possible, including ones in which memory 1004 communicates with processor 1010 via a bus. For example, some memories may be connected via a system bus, or in a data center, memory may be accessible in a remote DMA (RDMA) configuration.

Memory 1004 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1004 may be used for short, medium, and/or long-term storage. Memory 1004 may store any suitable data or information utilized by platform logic. In some embodiments, memory 1004 may also comprise storage for instructions that may be executed by the cores of processors 1002 or other processing elements (e.g., logic resident on chipsets 1016) to provide functionality.

In certain embodiments, memory 1004 may comprise a relatively low-latency volatile main memory, while storage 1050 may comprise a relatively higher-latency nonvolatile memory. However, memory 1004 and storage 1050 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1004 and storage 1050, for example, in a single physical memory device, and in other cases, memory 1004 and/or storage 1050 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1022 may be configured to provide a human-readable visual output, such as a command-line interface (CLI) or graphical desktop such as Microsoft Windows, Apple OSX desktop, or a Unix/Linux X Window System-based desktop. Graphics adapter 1022 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1022 may include a hardware graphics card, which may have its own memory and its own graphics processing unit (GPU).

Chipset 1016 may be in communication with a bus 1028 via an interface circuit. Bus 1028 may have one or more devices that communicate over it, such as a bus bridge 1032, I/O devices 1035, network interface 1048, accelerators 1046, communication devices 1040, and a keyboard and/or mouse 1038, by way of nonlimiting example. In general terms, the elements of hardware platform 1000 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1040 can broadly include any communication not covered by network interface 1048 and the various I/O devices described herein. This may include, for example, various universal serial bus (USB), FireWire, Lightning, or other serial or parallel devices that provide communications.

I/O Devices 1035 may be configured to interface with any auxiliary device that connects to hardware platform 1000 but that is not necessarily a part of the core architecture of hardware platform 1000. A peripheral may be operable to provide extended functionality to hardware platform 1000, and may or may not be wholly dependent on hardware platform 1000. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1042 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1032 may be in communication with other devices such as a keyboard/mouse 1038 (or other input devices such as a touch screen, trackball, etc.), communication devices 1040 (such as modems, network interface devices, peripheral interfaces such as PCI or PCIe, or other types of communication devices that may communicate through a network), audio I/O devices 1042, a data storage device 1044, and/or accelerators 1046. In alternative embodiments, any portions of the bus architectures could be implemented with one or more PtP links.

Operating system 1006 may be, for example, Microsoft Windows, Linux, UNIX, Mac OS X, iOS, MS-DOS, or an embedded or real-time operating system (including embedded or real-time flavors of the foregoing). In some embodiments, a hardware platform 1000 may function as a host platform for one or more guest systems that invoke application (e.g., operational agents 1008).

Operational agents 1008 may include one or more computing engines that may include one or more nontransitory computer-readable mediums having stored thereon executable instructions operable to instruct a processor to provide operational functions. At an appropriate time, such as upon booting hardware platform 1000 or upon a command from operating system 1006 or a user or security administrator, processor 1002 may retrieve a copy of the operational agent (or software portions thereof) from storage 1050 and load it into memory 1004. Processor 1010 may then iteratively execute the instructions of operational agents 1008 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 1048 may be provided to communicatively couple hardware platform 1000 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 1048 may include one or more physical ports that may couple to a cable (e.g., an Ethernet cable, other cable, or waveguide).

In some cases, some or all of the components of hardware platform 1000 may be virtualized, in particular the processor(s) and memory. For example, a virtualized environment may run on OS 1006, or OS 1006 could be replaced with a hypervisor or virtual machine manager. In this configuration, a virtual machine running on hardware platform 1000 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 10 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 11. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 11:
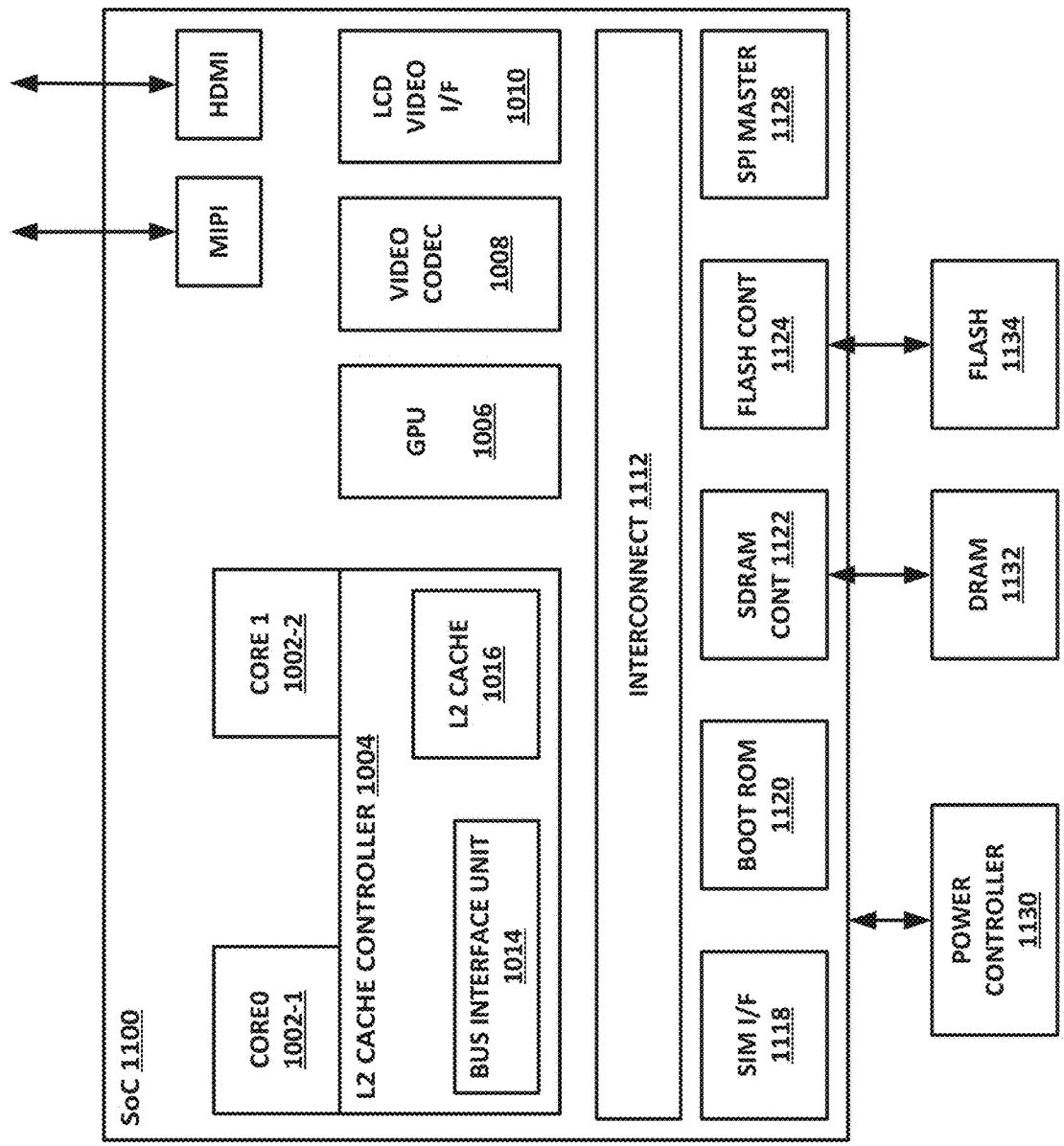
FIG. 11 is a block diagram of selected elements of a system-on-a-chip (SoC).

FIG. 11 is a block illustrating selected elements of an example SoC 1100. In at least some embodiments, SoC 1100 may be configured or adapted to provide a phishing mitigation service, as disclosed in the present specification.

At least some of the teachings of the present specification may be embodied on an SoC 1100, or may be paired with an SoC 1100. SoC 1100 may include, or may be paired with, an advanced reduced instruction set computer machine (ARM) component. For example, SoC 1100 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1100 could also be integrated into, for example, a PC, server, video processing components, laptop computer, notebook computer, netbook, or touch-enabled device.

As with hardware platform 1000 above, SoC 1100 may include multiple cores 1102a and 1102b. In this illustrative example, SoC 1100 also includes an L2 cache control 1104, a GPU 1106, a video codec 1108, a liquid crystal display (LCD) I/F 1110 and an interconnect 1112. L2 cache control 1104 can include a bus interface unit 1114, a L2 cache 1116. Liquid crystal display (LCD) I/F 1110 may be associated with mobile industry processor interface (MIPI)/HDMI links that couple to an LCD.

SoC 1100 may also include a subscriber identity module (SIM) I/F 1118, a boot ROM 1120, a synchronous dynamic random access memory (SDRAM) controller 1122, a flash controller 1124, a serial peripheral interface (SPI) master 1128, a suitable power control 1130, a dynamic RAM (DRAM) 1132, and flash 1134. In addition, one or more embodiments include one or more communication capabilities, interfaces, and features such as instances of Bluetooth™ 1136, a 3G modem 1138, a global positioning system (GPS) 1140, and an 802.11 Wi-Fi 1142.

Designers of integrated circuits such as SoC 1100 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 12 is a block diagram illustrating selected elements of a processor 1200. In at least some embodiments, processor 1200 may be configured or adapted to provide a phishing mitigation service, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1200 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1200 includes one or more processor cores 1202, including core 1202-1-1202-N. Cores 1202 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1200 may include at least one shared cache 1230, which may be treated logically as part of memory 1240. Caches 1230 may be filled according to known caching techniques, and may store instructions and/or data that may be used by one or more components of processor 1200.

Processor 1200 may include an integrated memory controller (MC) 1234, to communicate with memory 1240. Memory controller 1234 may include logic and circuitry to interface with memory 1240, and may also include a cache controller to handle filling and evicting instructions and data to and from cache 1230.

By way of example, each core 1202 may include front-end logic 1206, execution logic 1214, and backend logic 1218.

In the illustrated embodiment, front-end logic 1206 includes an instruction decoder or decoders 1208, register renaming logic 1210, and scheduling logic 1212. Decoder 1208 may decode instructions received. Register renaming logic 1210 may provide register renaming, for example to facilitate pipelining. Scheduling logic 1212 may schedule instruction execution, and may provide out-of-order (000) execution. Front-end logic 1206 may fetch incoming instructions, perform various processing (e.g., caching, decoding, branch predicting, etc.), and pass instructions to execution logic 1214.

Execution logic 1214 includes one or more execution units 1216-1-1216-N. Execution units 1216 may include hardware instructions and microcode to carry out the provided instructions.

Backend logic 1218 includes retirement logic 1220. Core 1202 may provide for speculative execution of instructions, branch prediction, and similar. Retirement logic 1220 may be configured to determine which predicted instructions were actually needed by the program flow.

Processor 1200 may also include a PtP controller 1232, which enables connection to an uncore, chipset, Northbridge, Southbridge, or bus, by way of example.

Figure 13:
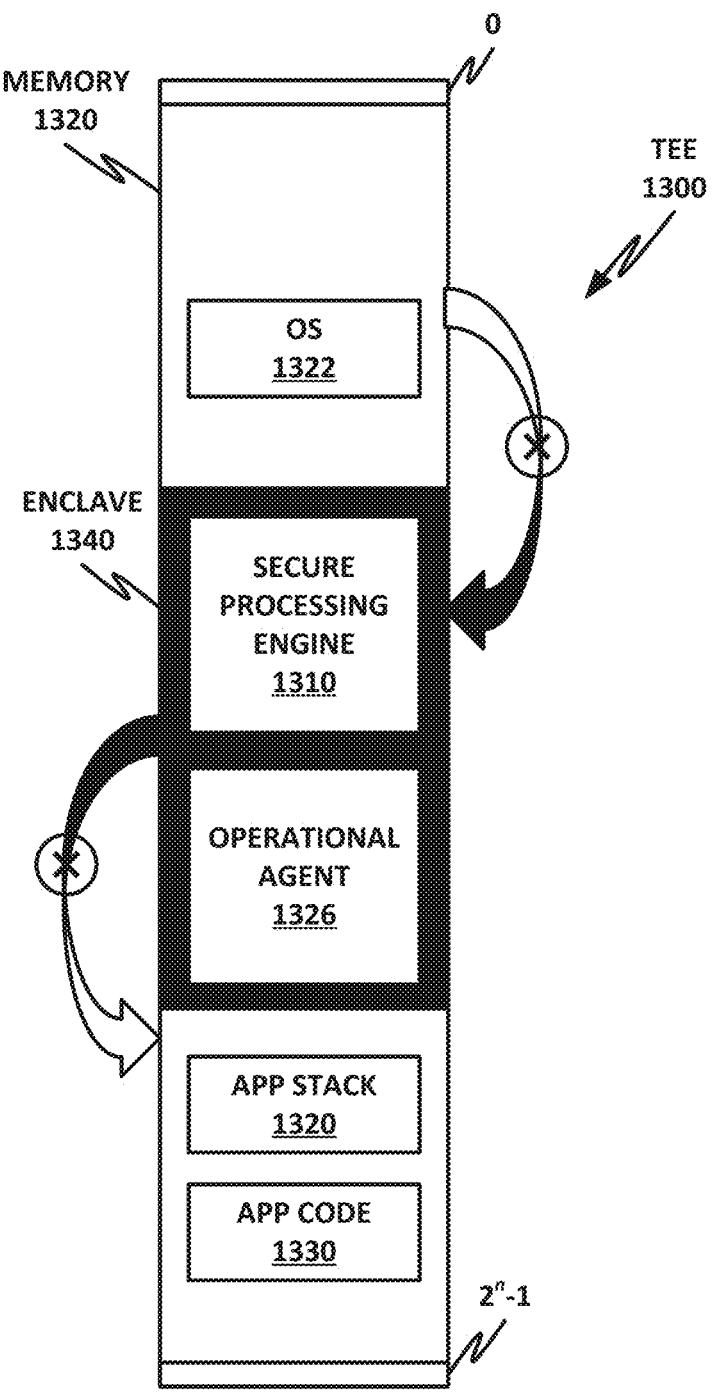
FIG. 13 is a block diagram of selected elements of a trusted execution environment (TEE).

FIG. 13 is a block diagram of a trusted execution environment (TEE) 1300. In at least some embodiments, a phishing mitigation service according to the teachings of the present specification may be provided within TEE 1000.

In the example of FIG. 13, memory 1320 is addressable by n-bits, ranging in address from 0 to $2^n-1$ (note, however, that in many cases, the size of the address space may far exceed the actual memory available). Within memory 1320 is an OS 1322, enclave 1340, application stack 1320, and application code 1330.

In this example, enclave 1340 is a specially-designated portion of memory 1320 that cannot be entered into or exited from except via special instructions, such as Intel® Software Guard Extensions (SGX™) or similar. Enclave 1340 is provided as an example of a secure environment which, in conjunction with a secure processing engine 1310, forms a TEE 1300 on a hardware platform such as platform 1000 of FIG. 10. A TEE 1300 is a combination of hardware, software, and/or memory allocation that provides the ability to securely execute instructions without interference from outside processes, in a verifiable way. By way of example, TEE 1300 may include memory enclave 1340 or some other protected memory area, and a secure processing engine 1310, which includes hardware, software, and instructions for accessing and operating on enclave 1340. Nonlimiting examples of solutions that either are or that can provide a TEE include Intel® SGX™, ARM TrustZone, AMD Platform Security Processor, Kinibi, securiTEE, OP-TEE, TLK, T6, Open TEE, SierraTEE, CSE, VT-x, MemCore, Canary Island, Docker, and Smack. Thus, it should be noted that in an example, secure processing engine 1310 may be a user-mode application that operates via trusted execution framework 1024 within enclave 1340. TEE 1300 may also conceptually include processor instructions that secure processing engine 1310 and trusted execution framework 1024 require to operate within enclave 1340.

Secure processing engine 1310 and trusted execution framework 1024 may together form a trusted computing base (TCB), which is a set of programs or computational units that are trusted to be secure. Conceptually, it may be advantageous to keep TCB relatively small so that there are fewer attack vectors for malware objects or for negligent software. Thus, for example, operating system 1322 may be excluded from TCB, in addition to the regular application stack 1320 and application code 1330.

In certain systems, computing devices equipped with Intel® SGX™ or equivalent instructions may be capable of providing an enclave 1340. It should be noted, however, that many other examples of TEEs are available, and TEE 1300 is provided only as one example thereof. Other secure environments may include, by way of nonlimiting example, a virtual machine, sandbox, testbed, test machine, or other similar device or method for providing a TEE 1300.

In an example, enclave 1340 provides a protected memory area that cannot be accessed or manipulated by ordinary computer instructions. Enclave 1340 is described with particular reference to an Intel® SGX™ enclave by way of example, but it is intended that enclave 1340 encompass any secure processing area with suitable properties, regardless of whether it is called an "enclave."

One feature of an enclave is that once an enclave region 1340 of memory 1320 is defined, as illustrated, a program pointer cannot enter or exit enclave 1340 without the use of special enclave instructions or directives, such as those provided by Intel® SGX™ architecture. For example, SGX™ processors provide the ENCLU[EENTER], ENCLU[ERESUME], and ENCLU[EEXIT]. These are the only instructions that may legitimately enter into or exit from enclave 1340.

Thus, once enclave 1340 is defined in memory 1004, a program executing within enclave 1340 may be safely verified to not operate outside of its bounds. This security feature means that secure processing engine 1310 is verifiably local to enclave 1340. Thus, when an untrusted packet provides its content to be rendered with trusted execution framework 1024 of enclave 1340, the result of the rendering is verified as secure.

Enclave 1340 may also digitally sign its output, which provides a verifiable means of ensuring that content has not been tampered with or modified since being rendered by secure processing engine 1310. A digital signature provided by enclave 1340 is unique to enclave 1340 and is unique to the hardware of the device hosting enclave 1340.

Figure 14:
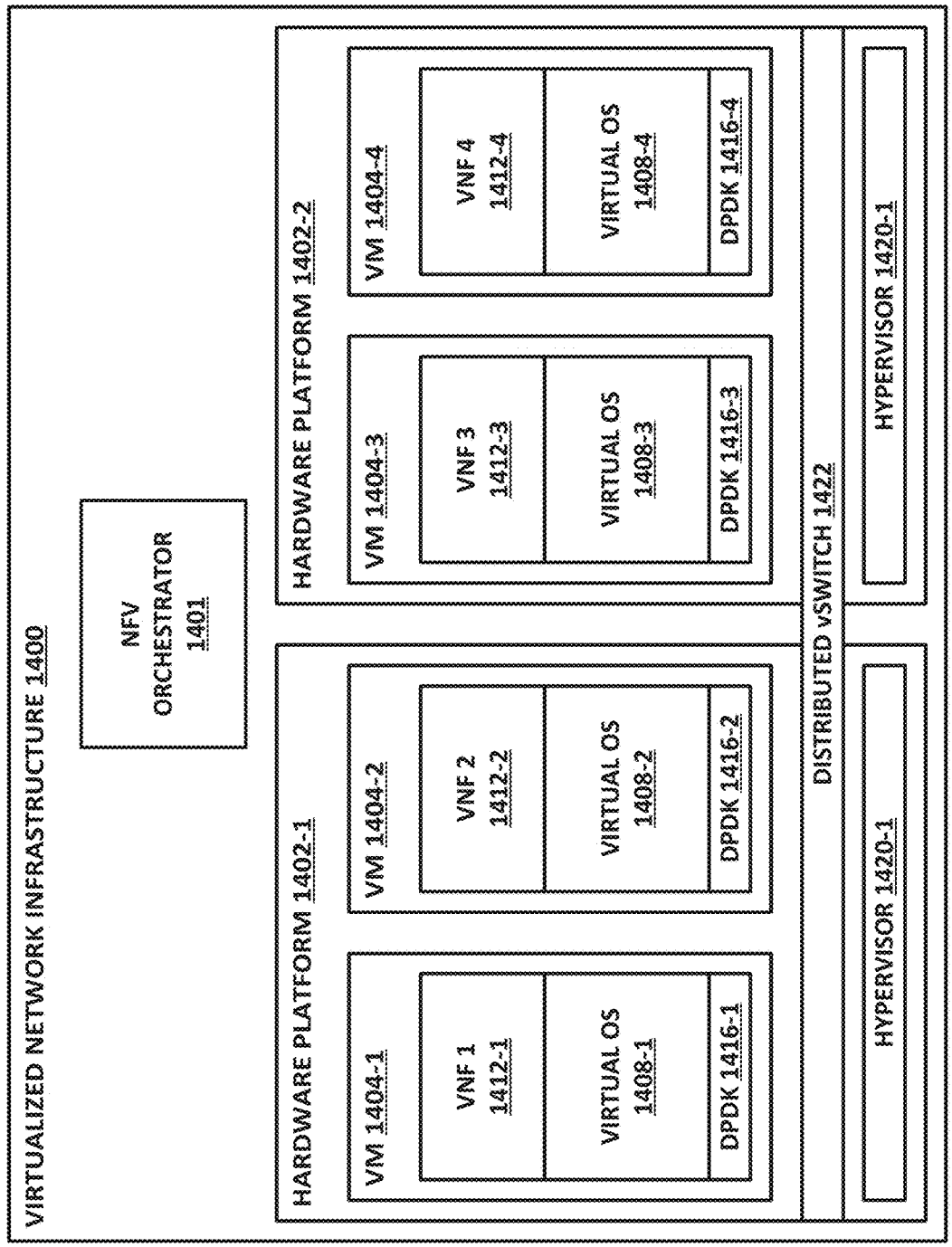
FIG. 14 is a block diagram of selected elements of a network function virtualization (NFV) infrastructure.

FIG. 14 is a block diagram of a network function virtualization (NFV) infrastructure 1400. In at least some embodiments, a phishing mitigation service according to the teachings of the present specification may be provided within NFV infrastructure 1400.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 14, an NFV orchestrator 1401 manages a number of the VNFs 1412 running on an NFVI 1400. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1401 a valuable system resource. Note that NFV orchestrator 1401 may provide a browser-based or graphical configuration interface, and in some embodiments may be integrated with SDN orchestration functions.

Note that NFV orchestrator 1401 itself may be virtualized (rather than a special-purpose hardware appliance). NFV orchestrator 1401 may be integrated within an existing SDN system, wherein an operations support system (OSS) manages the SDN. This may interact with cloud resource management systems (e.g., OpenStack) to provide NFV orchestration. An NFVI 1400 may include the hardware, software, and other infrastructure to enable VNFs to run. This may include a hardware platform 1402 on which one or more VMs 1404 may run. For example, hardware platform 1402-1 in this example runs VMs 1404-1 and 1404-2. Hardware platform 1402-2 runs VMs 1404-3 and 1404-4. Each hardware platform may include a hypervisor 1420, virtual machine manager (VMM), or similar function, which may include and run on a native (bare metal) operating system, which may be minimal so as to consume very few resources.

Hardware platforms 1402 may be or comprise a rack or several racks of blade or slot servers (including, e.g., processors, memory, and storage), one or more data centers, other hardware resources distributed across one or more geographic locations, hardware switches, or network interfaces. An NFVI 1400 may also include the software architecture that enables hypervisors to run and be managed by NFV orchestrator 1401.

Running on NFVI 1400 are a number of VMs 1404, each of which in this example is a VNF providing a virtual service appliance. Each VM 1404 in this example includes an instance of the Data Plane Development Kit (DPDK), a virtual operating system 1408, and an application providing the VNF 1412.

Virtualized network functions could include, as nonlimiting and illustrative examples, firewalls, intrusion detection systems, load balancers, routers, session border controllers, DPI services, network address translation (NAT) modules, or call security association.

The illustration of FIG. 14 shows that a number of VNFs 1404 have been provisioned and exist within NFVI 1400. This FIGURE does not necessarily illustrate any relationship between the VNFs and the larger network, or the packet flows that NFVI 1400 may employ.

The illustrated DPDK instances 1416 provide a set of highly-optimized libraries for communicating across a virtual switch (vSwitch) 1422. Like VMs 1404, vSwitch 1422 is provisioned and allocated by a hypervisor 1420. The hypervisor uses a network interface to connect the hardware platform to the data center fabric (e.g., an HFI). This HFI may be shared by all VMs 1404 running on a hardware platform 1402. Thus, a vSwitch may be allocated to switch traffic between VMs 1404. The vSwitch may be a pure software vSwitch (e.g., a shared memory vSwitch), which may be optimized so that data are not moved between memory locations, but rather, the data may stay in one place, and pointers may be passed between VMs 1404 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1422 is illustrated, wherein vSwitch 1422 is shared between two or more physical hardware platforms 1402.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a hardware platform comprising a processor and a memory; a network interface; and a phishing mitigation engine comprising instructions encoded within the memory to: receive via the network request a validation request from a mobile computing device, the validation request comprising an e-mail payload; query a cloud phishing reputation service for a reputation, the query comprising information from the e-mail payload; receive from the cloud phishing reputation service reputation data for the e-mail payload; and provide a push notification to the mobile computing device, the push notification comprising a reputation notice for the e-mail payload.

There is further disclosed an example computing apparatus, wherein the reputation notice comprises a high-confidence reputation that the e-mail payload includes phishing content, and wherein the push notification includes an instruction not to open the e-mail payload.

There is further disclosed an example computing apparatus, wherein the reputation notice comprises a high-confidence reputation that the e-mail payload is non-malicious, and wherein the push notification includes an instruction that the e-mail payload can be safely opened.

There is further disclosed an example computing apparatus, wherein the reputation notice comprises a low-confidence reputation, and wherein the push notification comprises a warning that a reliable reputation for the e-mail payload could not be computed.

There is further disclosed an example computing apparatus, wherein the instructions are further to extract link information from the e-mail payload, and wherein querying the cloud phishing reputation service comprises querying a uniform resource locator (URL) reputation service for link reputations.

There is further disclosed an example computing apparatus, wherein the reputation notice for the e-mail payload comprises a not-safe reputation if at least one link has a high-confidence reputation for being a phishing link.

There is further disclosed an example computing apparatus, wherein the instructions are further to provide information from an attachment of the e-mail payload to the cloud reputation service, and wherein the reputation data comprise reputation data for the attachment.

There is further disclosed an example computing apparatus, wherein the instructions are further to provide a screenshot image of the e-mail payload, and wherein the reputation data comprise reputation data based on a visual analysis of the e-mail payload.

There is further disclosed an example computing apparatus, wherein the validation request comprises a forwarded e-mail.

There is further disclosed an example computing apparatus, wherein the validation request comprises a one-click reputation request from the mobile computing device.

There is also disclosed an example phishing mitigation ecosystem, comprising: a user endpoint device, comprising: an e-mail client including a user interface to provide a low-overhead user interaction to provide a phishing analysis request for an e-mail; a phishing analysis server, comprising: a receiver module to receive the phishing analysis request from the user endpoint device; an extraction module to extract analysis data from the phishing analysis request; a request module to request a reputation, and to receive a reputation response comprising a reputation associated with the request for a reputation; and a response module to provide a response to the user endpoint device comprising a safety indicator for the phishing analysis request; and a cloud reputation service, comprising: a reputation store; a receiver module to receive the request for a reputation; an analysis module to analyze the request for a reputation and to assign a reputation from the reputation store; and a response module to provide the reputation response to the phishing analysis server.

There is further disclosed an example phishing mitigation ecosystem, wherein the user endpoint device is a smart phone or tablet.

There is further disclosed an example phishing mitigation ecosystem, wherein response to the user endpoint device comprises a push notification.

There is further disclosed an example phishing mitigation ecosystem, wherein the phishing analysis server further comprises a module to remotely instruct the user endpoint device to delete or quarantine an e-mail after determining with high confidence that the e-mail is a malicious phishing e-mail.

There is further disclosed an example phishing mitigation ecosystem, wherein the response to the user endpoint device comprises an e-mail flag indicating that an e-mail is green (safe), red (unsafe), or yellow (reputation not determined with confidence above a threshold).

There is further disclosed an example phishing mitigation ecosystem, wherein the low-overhead user interaction comprises providing authentication credentials to the phishing analysis server for a user's web e-mail.

There is further disclosed an example phishing mitigation ecosystem, wherein receiving the request for a reputation comprises retrieving the user's incoming mail via post office protocol (POP) or internet message access protocol (IMAP) without deleting the incoming mail or marking the incoming mail as read.

There is also disclosed an example method of detecting phishing or malicious e-mail content, comprising: conditioning an end user operating an endpoint device to identify an e-mail as suspicious with a low threshold for suspiciousness, wherein the threshold for suspiciousness includes any e-mail that may potentially collect personal, enterprise, or financial information; receiving from the end user a request to verify a suspicious e-mail; extracting content from the suspicious e-mail; forwarding the extracted content to a public cloud reputation service; receiving from the public cloud reputation service a reputation for the extracted content; and providing to the endpoint device a reputation for the suspicious e-mail.

There is further disclosed an example method, wherein providing the reputation for the suspicious e-mail comprises providing a push notification to the endpoint device.

There is further disclosed an example method, wherein providing the reputation for the suspicious e-mail comprises providing electronic information regarding the reputation for the suspicious e-mail.

There is also disclosed an example e-mail client for a mobile, desktop, or laptop device, comprising: a graphical user interface (GUI) for interacting with a user mailbox; a one-click e-mail reputation interface, the one-click reputation interface comprising instructions to receive a user click or tap input, and responsive to the user click or tap input, to query a phishing reputation server for a reputation for a currently-selected e-mail; and a response interface comprising instructions to display to the user information received from the phishing reputation server including a reputation for the selected e-mail.

There is further disclosed an example e-mail client, wherein the one-click e-mail reputation interface comprises a plugin to a third-party e-mail client.

There is further disclosed an example e-mail client, wherein the response interface comprises a plugin to the third-party e-mail client.

There is further disclosed in example 1, a method of providing passive phishing remediation for an enterprise, comprising: displaying, to a user of a mobile device, an email; receiving from the user a one-click request to perform additional analysis of the email; providing the email to a phishing mitigation service; requesting, from a uniform resource locator (URL) reputation service, a reputation for a URL associated with the email; scanning an attachment to the email for phishing or malware features; analyzing the email for phishing features; assigning the email an overall phishing score based on the analyzing, the scanning, and the reputation for the URL; generating a human-readable reputation display for the email, wherein the human-readable reputation display includes at least three grades comprising safe, unknown or unreliable, and unsafe or malicious; and providing the human-readable reputation display as a push notification to the mobile device.

There is further disclosed in example 2, the method of example 1, further comprising training or conditioning the user to identify emails that benefit from additional analysis.

There is further disclosed in example 3, the method of example 1, wherein training or conditioning the user comprises encouraging the user to double check emails purporting to be from banking, ecommerce, or e-payment websites or services.

There is further disclosed in example 4, the method of example 1, further comprising an email client or email client plugin to provide one-click request functionality.

There is further disclosed in example 5, the method of example 1, further comprising visual analysis of the email to identify phishing features.

There is further disclosed in example 6, the method of example 1, further comprising identifying deceptive colors, fonts, or logos to identify phishing features.

There is further disclosed in example 7, the method of example 1, further comprising identifying use of unsecured hypertext transfer protocol (HTTP) as a phishing indicator.

There is further disclosed in example 8, the method of example 1, wherein the human-readable reputation display displays safe as green, unknown or unreliable as yellow, and unsafe or malicious as red.

There is further disclosed in example 9, the method of example 1, further comprising, upon determining that the overall phishing score is unsafe or malicious, providing with the push notification a textual instruction not to open links on the email.

There is further disclosed in example 10, the method of example 1, further comprising, upon determining that the overall phishing score is safe, providing with the push notification a textual instruction that the user can safely interact with the email.

There is further disclosed in example 11, an apparatus comprising means for performing the method of any of examples 1-10.

There is further disclosed in example 12, the apparatus of example 11, wherein the means for performing the method comprise a processor and a memory.

There is further disclosed in example 13, the apparatus of claim 12, wherein the memory comprises machine-readable instructions that, when executed, cause the apparatus to perform the method of any of examples 1-10.

There is further disclosed in example 14, the apparatus of any of examples 11-13, wherein the apparatus is a computing system.

There is further disclosed in example 15, at least one computer readable medium comprising instructions that, when executed, implement a method or realize an apparatus as claimed in any of examples 1-14.

There is further disclosed in example 16, one or more tangible, nontransitory computer-readable storage media having stored thereon executable instructions to instruct a processor circuit to: receive, from a user of a mobile device, a one-click request to perform additional analysis of an email; provide the email to a phishing mitigation service; request, from a uniform resource locator (URL) reputation service, a reputation for a URL associated with the email; scan an attachment to the email for phishing or malware features; analyze the email for phishing features; assign the email an overall phishing score based on the analyzing, the scanning, and the reputation for the URL; generate a human-readable reputation display for the email, wherein the human-readable reputation display includes at least three grades comprising safe, unknown or unreliable, and unsafe or malicious; and provide the human-readable reputation display as a push notification to the mobile device.

There is further disclosed in example 17, the one or more tangible, nontransitory computer-readable media of example 16, wherein the executable instructions are further to provide an email client or email client plugin to provide one-click request functionality.

There is further disclosed in example 18, the one or more tangible, nontransitory computer-readable media of example 16, wherein the executable instructions are further to provide visual analysis of the email to identify phishing features.

There is further disclosed in example 19, the one or more tangible, nontransitory computer-readable media of example 16, wherein the executable instructions are further to identify deceptive colors, fonts, or logos to identify phishing features.

There is further disclosed in example 20, the one or more tangible, nontransitory computer-readable media of example 16, wherein the executable instructions are further to identify use of unsecured hypertext transfer protocol (HTTP) as a phishing indicator.

There is further disclosed in example 21, the one or more tangible, nontransitory computer-readable media of example 16, wherein the human-readable reputation display displays safe as green, unknown or unreliable as yellow, and unsafe or malicious as red.

There is further disclosed in example 22, the one or more tangible, nontransitory computer-readable media of example 16, wherein the executable instructions are further to, upon determining that the overall phishing score is unsafe or malicious, provide with the push notification a textual instruction not to open links on the email.

There is further disclosed in example 23, the one or more tangible, nontransitory computer-readable media of example 16, wherein the executable instructions are further to, upon determining that the overall phishing score is safe, provide with the push notification a textual instruction that the user can safely interact with the email.

There is further disclosed in example 24, a computing ecosystem, comprising: an email client application to display, to a user of an end-user device, an email; a cloud-based phishing mitigation service, configured to: receive, from the user, a one-click request to perform additional analysis of the email; request, from a uniform resource locator (URL) reputation service, a reputation for a URL associated with the email; scan an attachment to the email for phishing or malware features; analyze the email for phishing features; assign the email an overall phishing score based on the analyzing, the scanning, and the reputation for the URL; generate a human-readable reputation display for the email, wherein the human-readable reputation display includes at least three grades comprising safe, unknown or unreliable, and unsafe or malicious; and provide the human-readable reputation display as a push notification to the end-user device.

There is further disclosed in example 25, the computing ecosystem of example 24, further comprising an email client plugin to provide one-click request functionality.

There is further disclosed in example 26, the computing ecosystem of example 24, wherein the cloud-based phishing mitigation service is further configured to provide visual analysis of the email to identify phishing features.

There is further disclosed in example 27, the computing ecosystem of example 24, wherein the cloud-based phishing mitigation service is further configured to identify deceptive colors, fonts, or logos to identify phishing features.

There is further disclosed in example 28, the computing ecosystem of example 24, wherein the cloud-based phishing mitigation service is further configured to identify use of unsecured hypertext transfer protocol (HTTP) as a phishing indicator.

There is further disclosed in example 29, the computing ecosystem of example 24, wherein the human-readable reputation display displays safe as green, unknown or unreliable as yellow, and unsafe or malicious as red.

There is further disclosed in example 30, the computing ecosystem of example 24, wherein the cloud-based phishing mitigation service is further configured to, upon determining that the overall phishing score is unsafe or malicious, provide with the push notification a textual instruction not to open links on the email.

There is further disclosed in example 31, the computing ecosystem of example 24, wherein the cloud-based phishing mitigation service is further configured to, upon determining that the overall phishing score is safe, provide with the push notification a textual instruction that the user can safely interact with the email.

What is claimed is:

1. A method of phishing remediation, the method comprising:
   receiving, by a phishing mitigation server, an e-mail address for an online e-mail service;
   accessing, by the phishing mitigation server, a mailbox, at least in part based on the e-mail address,to receive an email;
   downloading, by the phishing mitigation server, a copy of the email without marking the email as read or opened;
   requesting, from a uniform resource locator (URL) reputation service, a reputation for a URL associated with the email;
   scanning an attachment to the email for phishing or malware features;
   analyzing the email for phishing features;
   assigning, by the phishing mitigation server, the email an overall phishing score based on the analyzing, the scanning, and the reputation for the URL; and
   flagging the email with a warning, at least in part based on the overall phishing score.

2. The method of claim 1, further comprising identifying colors, fonts, or logos to identify phishing features.

3. The method of claim 1, further comprising identifying use of unsecured hypertext transfer protocol (HTTP) as a phishing indicator.

4. The method of claim 1, further comprising:
   generating a human-readable reputation display for the email, wherein the human-readable reputation display includes at least three grades comprising safe, unknown or unreliable, and unsafe or malicious; and
   providing the human-readable reputation display as a push notification.

5. The method of claim 4, wherein the human-readable reputation display displays safe as green, unknown or unreliable as yellow, and unsafe or malicious as red.

6. The method of claim 4, further comprising,
   upon determining that the overall phishing score is unsafe or malicious, providing with the push notification a textual instruction not to open links on the email.

7. The method of claim 4, further comprising,
   upon determining that the overall phishing score is safe, providing with the push notification a textual instruction that a user can safely interact with the email.

8. The method of claim 1, further comprising:
   deleting the email from the mailbox or moving the email to a spam folder, at least in part based on the overall phishing score.

9. One or more tangible, nontransitory computer-readable storage media having stored thereon executable instructions, the instructions to instruct a processor to:
   receive an e-mail address for an online e-mail service;
   access a mailbox, at least in part based on the e-mail address, to receive an email;

download a copy of the email without marking the email as read or opened;

request, from a uniform resource locator (URL) reputation service, a reputation for a URL associated with the email;

scan an attachment to the email for phishing or malware features;

analyze the email for phishing features;

assign the email an overall phishing score based on the analyzing, the scanning, and the reputation for the URL; and flag the email with a warning, at least in part based on the overall phishing score.

10. The one or more tangible, nontransitory computer-readable media of claim 9, wherein the executable instructions are further to instruct the processor to identify colors, fonts, or logos to identify phishing features.

11. The one or more tangible, nontransitory computer-readable media of claim 9, wherein the executable instructions are further to instruct the processor to identify use of unsecured hypertext transfer protocol (HTTP) as a phishing indicator.

12. The one or more tangible, nontransitory computer-readable media of claim 9, wherein the executable instructions are further to instruct the processor to generate a human-readable reputation display for the email, wherein the human-readable reputation display includes at least three grades comprising safe, unknown or unreliable, and unsafe or malicious; and provide the human-readable reputation display as a push notification.

13. The one or more tangible, nontransitory computer-readable media of claim 12, wherein the executable instructions are further to instruct the processor to, upon determining that the overall phishing score is unsafe or malicious, provide with the push notification a textual instruction not to open links on the email.

14. The one or more tangible, nontransitory computer-readable media of claim 12, wherein the executable instructions are further to instruct the processor to, upon determining that the overall phishing score is safe, provide with the push notification a textual instruction that a user can safely interact with the email.

15. A cloud-based phishing mitigation server, comprising:

a network interface configured to receive an e-mail address for an online e-mail service;

access a mailbox, at least in part based on the e-mail address, to receive an email;

download a copy of the email without marking the email as read or opened; and query a uniform resource locator (URL) reputation service, and receive a reputation for a URL associated with the email; and a processor configured to scan an attachment to the email for phishing or malware features;

analyze the email for phishing features;

assign the email an overall phishing score based on the analyzing, the scanning, and the reputation for the URL; and flag the email with a warning, at least in part based on the overall phishing score.

16. The server of claim 15, wherein the processor is further configured to delete the email from the mailbox or move the email to a spam folder, at least in part based on the overall phishing score.

17. The server of claim 15, wherein the processor is further configured to keep the email in the mailbox, at least in part based on the overall phishing score.

18. The server of claim 15, wherein the processor is further configured to identify colors, fonts, or logos to identify phishing features.

19. The server of claim 15, wherein the processor is further configured to identify use of unsecured hypertext transfer protocol (HTTP) as a phishing indicator.

20. The server of claim 15, wherein the overall phishing score is at least one of good/safe, unknown/unreliable, or phishing/bad/malicious/unsafe, the processor is further configured to leave the email alone, if the overall phishing score is good/safe, the processor is further configured to flag the email with the warning, if the overall phishing score is unknown/unreliable, and the processor is further configured to delete the email from the mailbox or move the email to a spam folder, if the overall phishing score is phishing/bad/malicious/unsafe.

* * * * *